US012734112B2

(12) United States Patent
Marcoz

(10) Patent No.: US 12,734,112 B2
(45) Date of Patent: Sep. 15, 2026

(54) AUTOMATIC, GRAVITY-FED, SOLID DOSAGE FORM DISPENSER

(71) Applicant: BIOCORP PRODUCTION S.A.S., Issoire (FR)

(72) Inventor: Alain Marcoz, Montmorin (FR)

(73) Assignee: BIOCORP PRODUCTION S.A.S., Issoire (FR)

( * ) Notice: Subject to any disclaimer, the term of this patent is extended or adjusted under 35 U.S.C. 154(b) by 247 days.

(21) Appl. No.: 18/729,019

(22) PCT Filed: Jan. 21, 2022

(86) PCT No.: PCT/IB2022/000046
§ 371 (c)(1),
(2) Date: Jul. 15, 2024

(87) PCT Pub. No.: WO2023/139400
PCT Pub. Date: Jul. 27, 2023

(65) Prior Publication Data

US 2025/0161166 A1 May 22, 2025

(51) Int. Cl.
*A61J 7/00* (2006.01)
*A61J 7/04* (2006.01)

(52) U.S. Cl.
CPC ........... *A61J 7/0084* (2013.01); *A61J 7/0481* (2013.01); *A61J 2200/70* (2013.01); *A61J 2205/00* (2013.01)

(58) Field of Classification Search
CPC ...... A61J 7/0084; A61J 7/0481; A61J 220/70; A61J 2205/00; B65D 83/0409; B65D 2585/56; G16H 20/13
See application file for complete search history.

(56) References Cited

U.S. PATENT DOCUMENTS 1,715,726 A * 6/1929 Tomoda .................... A47F 1/10 221/83
4,573,606 A * 3/1986 Lewis ................... A61J 7/0481 221/3

(Continued)

OTHER PUBLICATIONS

International Search Report for corresponding patent application No. PCT/IB2022/000046, dated Aug. 23, 2022, 3 pages.

(Continued)

*Primary Examiner* — Gene O Crawford
*Assistant Examiner* — Kelvin L Randall, Jr.
(74) *Attorney, Agent, or Firm* — PATTERSON INTELLECTUAL PROPERTY LAW, P.C.; Emily A. Shouse

(57) ABSTRACT

An automatic, gravity-fed, solid dosage form dispenser, comprising: at least one rotatable dose dispensing wheel, the dispensing wheels having a central drive mounting and comprising a plurality of solid dosage form holding compartments; a wheel housing having a base plate with a first side and a second side with first and second housing walls extending from the base plate to sub-housings, each one positioned on a respective side of the base plate to receive a dispensing wheel; and an interactive user interface device configured to control independent rotation of the dispensing wheels; wherein the respective dispensing wheels are positioned along a common axis of rotation perpendicular to the base plate of the wheel housing; and wherein the interactive user interface device is mounted to the wheel housing tangentially to an outer peripheral surface of the wheel housing walls.

21 Claims, 9 Drawing Sheets

(56) References Cited

U.S. PATENT DOCUMENTS

| | | | | |
|---|---|---|---|---|
| 4,842,161 | A * | 6/1989 | Krakauer | G07F 11/52 312/305 |
| 4,953,745 | A * | 9/1990 | Rowlett, Jr. | G07F 17/0092 221/7 |
| 5,915,589 | A | 6/1999 | Lim | |
| 10,494,165 | B2 * | 12/2019 | Sterns | B65D 83/04 |
| D885,747 | S * | 6/2020 | Musini Traglio | D3/203.2 |
| D1,025,587 | S * | 5/2024 | Marcoz | D3/203.2 |
| 12,002,320 | B1 * | 6/2024 | Sanso | G16H 20/13 |
| 2002/0047019 | A1 * | 4/2002 | Devers | A61J 7/0481 221/2 |
| 2002/0088817 | A1 * | 7/2002 | Bell-Greenstreet | G07F 17/0092 221/76 |
| 2006/0180600 | A1 | 8/2006 | Talyor | |
| 2009/0294323 | A1 | 12/2009 | Luciano et al. | |
| 2010/0030374 | A1 * | 2/2010 | Saltsov | A61J 7/0481 700/231 |
| 2014/0277702 | A1 | 9/2014 | Shaw | |
| 2019/0374436 | A1 * | 12/2019 | Townley | G16H 40/63 |
| 2020/0060936 | A1 * | 2/2020 | Waugh | A61J 7/04 |
| 2022/0375564 | A1 * | 11/2022 | Rosomoff | G06F 21/602 |

OTHER PUBLICATIONS

International Search Report for corresponding patent application No. PCT/IB2022/000046, dated Aug. 23, 2022, 2 pages.

* cited by examiner

AUTOMATIC, GRAVITY-FED, SOLID DOSAGE FORM DISPENSER

The present invention relates to the general field of solid dosage form dispensers, and in particular and in particular to gravity-fed solid dosage form dispensers for drugs or medicines.

Gravity fed solid dosage form dispensers have been known for a while, for example, in relation to sweet dispenser or other small or medium-sized solid objects that are usually stored in a container or recipient located at the top of the dispenser, and beneath which an exit port has been provided with an actionable closure system that may be activated to open the closure either manually or by some other means, for example, a mechanical or motorized system. Once the closure system exit port has been activated to open the closure, the solid dosage form falls due to gravity through the dispenser and out through the exit port. A classic example of such a system is known for example from the bubblegum dispensers commonly found on piers, sweet shops, and grocery stores.

In more recent years mechanization and automation have taken over from the purely manually operated devices of the past. This is particularly true in relation to the dispensing of medicines or drugs for particular patients or patient groups.

For example, U.S. Pat. No. 4,573,606A discloses an automatic pill dispenser system for dispensing medical pills having different prescribed administration schedules. The dispenser provides a plurality of pill storage compartments, each of which is capable of holding more than one pill, an automatic release mechanism for dispensing pills at predetermined time intervals corresponding with their respective administration schedules, and a pill receptacle coupled to a pill detector. When a pill is dispensed from the pill dispenser and received by the receptacle, a signal is generated to alert the patient to take the dispensed medicine. The dispenser system provides a single rotatable dispensing wheel, having a central mounting and comprising twelve storage compartments arranged in a ring and defined by at least a first and a second opposing walls extending outwardly respectively from the central mounting of the rotatable wheel. The wheel is mounted vertically on an axle which projects forward towards the front face of the dispensing device. The loading face of the storage compartments thus lies parallel to the front face of the dispenser. The storage compartments are preloaded from the front individually by a patient with all the pills prescribed to be taken during a 24-hour period. The patient loads pills into each individual storage compartment from the front according to a loading code that corresponds to the respective administration schedules of the pills. The pill dispenser automatically sequentially rotates the storage compartments over a trapdoor which is operated to empty each compartment positioned above it. A photoelectric detector detects pills that have fallen into the cup and responds by alerting the patient with an audible or visual signal. Alternatively, a preloadable storage canister can be provided fully loaded for a given 24 hour period by a pharmacist.

Other such front facing, vertically mounted, rotatable, wheel-shaped drug storage compartments for automatic pill dispensers are also known from U.S. Pat. No. 5,915,589A, and US patent application published as US2006180600A1.

Similarly, automatic pill dispensing devices in which the wheel-shaped drug storage compartments are mounted on an axis which is orthogonal to the front face of the dispenser are also known. In this configuration, the wheel is mounted, and rotates, edge on with regard to the front face of the dispensing device, such as is disclosed in US patent application published as US2014277702A1, for example.

Despite the above proposed solutions, there still remains a number of problems with their use. For example, these known devices tend to be fairly bulky and quite heavy, which makes them difficult to use or position in a domestic setting or care home for example. Additionally, they often do not cater for the dispensing of two different treatment regimes for different people at the same time, for example, in the case of an elderly or frail couple. Furthermore, they require a certain degree of manual dexterity in order to be filled correctly with the relevant prescribed dosage forms. Whilst such manual dexterity might be available in a pharmacy or via the supply of preloaded cassettes, using these dispensing devices in a domestic setting such as at home, or in a care home, for elderly or frail people, or for people suffering from neurological disorders in which hand to eye coordination is suboptimal, is potentially fraught with frustration and the significant risk of filling the storage chambers with either the incorrect solid dosage form, or the incorrect number of solid dosage forms, potentially with life endangering consequences.

Accordingly, a first aspect of the invention is an automatic, gravity-fed, solid dosage form dispenser, comprising:

a first rotatable dose dispensing wheel and a second rotatable dose dispensing wheel, the first and second rotatable dose dispensing wheels each having a central drive mounting and each comprising a plurality of solid dosage form holding compartments defined by at least a first and a second opposing walls extending outwardly respectively from, or proximate, the central drive mounting of the first rotatable wheel and the second rotatable wheel, towards a respective outer periphery of the first rotatable wheel and the second rotatable wheel;

a wheel housing having a base plate with a first side and a second side opposite the first side, and a respective first housing wall and a second housing wall, the first and second housing walls extending respectively outwardly and circumferentially from, and along, an outer peripheral edge of the base plate to form two sub-housings, each sub-housing positioned on a respective side of the base plate, and defining a respective first outwardly facing opening and a second outwardly facing opening to receive said first rotatable dose dispensing wheel and said second rotatable dose dispensing wheel therein respectively; and an interactive user interface device configured to control operation of the automatic, solid dosage form dispenser;

wherein the first and said second rotatable dose dispensing wheels are configured to be rotatable independently of one another via their respective central drive mountings;

wherein the respective first and second rotatable dose dispensing wheels and central drive mountings are positioned along a single common axis of rotation which is perpendicular to the base plate of the wheel housing;

wherein the interactive user interface device is mounted to the wheel housing in a plane which is substantially tangential to an outer peripheral surface of both the first and second housing walls of the wheel housing; and an independent rotation of each of the first and said second rotatable dose dispensing wheels within their respective first and second wheel housings is controlled via the interactive user interface device.

It is to be understood in the present context that the expression “gravity-fed” signifies that the solid dosage forms are introduced into the dispensing device using a gravitational effect, in other words, using the natural effect of the gravitational pull of the planet or similar body, or an artificially generated gravitational force, on the dosage forms as they are loaded, or dropped, into the dispensing device. Similarly, this expression extends to the actual delivery of the solid dosage forms at an exit point of the dispensing device, in which the solid dosage forms fall due to the gravitational pull of the planet or similar body, or an artificially generated gravitational force.

The dispensing device comprises both a first rotatable dose dispensing wheel and a second rotatable dose dispensing wheel. The first and second rotatable dose dispensing wheels each have a central drive mounting, for example, in the shape of a hub, and each wheel comprises a plurality of solid dosage form holding compartments, or storage chambers. The holding compartments are defined by at least a first and a second opposing walls which extend outwardly respectively from, or proximate to, the central drive mounting of the rotatable wheel, towards a respective outer periphery of the rotatable wheel. Each compartment wall has a peripheral edge that faces radially outwardly from the central drive mounting. The outer periphery of each wheel is thus a virtually defined, or imaginary, peripheral and circumferential line which is formed by the intersection of the imaginary line with each of the outward facing peripheral edges of the radially extending compartment walls. It will thus be understood from that the first and second dispensing wheels are similar in configuration to a bicycle wheel having a hub for the central axle and a series of spokes, representing the outwardly extending opposing walls defining the holding compartments, or storage chambers, for the solid dosage forms, and in which the radially outward ends of the spokes define the outer periphery of the wheel.

According to another advantageous aspect, each dispensing wheel further comprises a base plate, the base plate extending radially outwards from the central drive mounting, for example, forming a disc, along a first side face of the wheel. The base plate is preferably in contact with the radially outwardly extending walls, or is formed as an integral part of the dispensing wheel structure as a whole. Such an integrated structure comprising the wheel base plate and radially extending compartment walls can be suitably provided for example, through molding, shaping, or depositing, of an appropriate material, for example, a polymeric material, such as an impact resistant ABS polymer or any other suitably shapeable polymeric material, for example, such as those polymers typically used in 3D printing. Alternatively, a light metal or metal alloy could be used, such as an aluminium or titanium alloy, or any alternatively acceptable material formed to provide the desired configuration and shape.

The central drive mounting can advantageously be shaped as a hub with a peripheral circumferential wall that extends and projects away from a second side face, opposite to the first side face, of the dispensing wheel base plate. The peripheral circumferential wall can be provided with a concave shaped wall which extends from the peripheral circumferential wall towards a central point to close the hub and form a concave outward facing surface. In such a configuration, the compartment walls of the dispensing wheel extend radially outwards from the peripheral circumferential wall of the hub-shaped central drive mounting and along the dispensing wheel base plate. The central drive mounting is further advantageously provided with a seating nipple, which projects outwardly from the concave shaped wall at the centre point thereof. The nipple is configured and shaped on an inside facing surface of the nipple to receive and engage with a drive motor, for example, via a drive cog or gear connected to the drive shaft of the drive motor.

Each respective first and second dispensing wheel is housed within a wheel housing. The wheel housing has a base plate with a first side, and a second side opposite the first side, and a respective first housing wall and a second housing wall. The first and second housing walls extend respectively outwardly and circumferentially from, and along, an outer peripheral edge of the base plate to form two sub-housings, each sub-housing positioned on a respective side of the base plate, and defining a respective first outwardly facing opening and a second outwardly facing opening. Each opening receives and houses a respective dispensing wheel. It will be understood that the wheel housing is thus shaped like a cylinder in which a central partitioning wall extends across the cylinder bore from one inside wall of the cylinder to the opposite inside wall of the cylinder. The internal volumes which are defined by the inner walls of the cylinder and the central partitioning wall are the volumes used to receive and house each of the respective dispensing wheels, and seat the respective central drive mounts of each dispensing wheel. The wheel housing base plate is configured to receive, respectively on the first and second opposite side, a drive motor, whereby the respective drive motor shaft and drive cog or gear are positioned to enable corresponding drive engagement with the appropriately configured and shaped inside facing surface of the nipple of the central drive mounting. The wheel housing can be suitably provided for example, through molding, shaping, or depositing, of an appropriate material, for example, a polymeric material, such as an impact resistant ABS polymer or any other suitably shapeable polymeric material, for example, such as those polymers typically used in 3D printing. Alternatively, a light metal or metal alloy could be used, such as an aluminium or titanium alloy, or any alternatively acceptable material formed to provide the desired configuration and shape.

As will be understood from the description of the dispensing wheels and wheel housing, the first and said second rotatable dose dispensing wheels are configured to be rotatable independently of one another via their respective central drive mountings. It is believed that this has not yet been disclosed or suggested in any of the known devices described in the art. Such an arrangement makes it possible to provide an automatic, solid dosage form dispensing device which is adapted for two different people, each having their own individualized dosage regime.

Additionally, and according to a further aspect, the respective first and second rotatable dose dispensing wheels and central drive mountings are positioned along a single common axis of rotation which is perpendicular to the base plate of the wheel housing. It is also believed that such a configuration, in combination with the provision of an independent rotation of each of the dispensing wheels, has not been disclosed or suggested in any of the known devices described in the art.

Optionally and advantageously, and according to another aspect, the wheel housing can be provided with an outer aesthetically shaped surrounding shell, for example, made of the same material as the wheel housing. The outer aesthetically shaped surrounding shell is configured and dimensioned to engage with and extend around the wheel housing whilst leaving a maintenance opening for access by the user to each of the two dispensing wheels, should such access be required, for example, for maintenance purposes. To this extent, the outer aesthetically shaped surrounding shell can be considered to be an extension of the wheel housing, and form an outer peripheral surface of the wheel housing. Each maintenance opening of the outer aesthetically shaped surrounding shell can be advantageously closed by a respectively shaped and dimensioned first and second removable cover adapted to fit and fill the corresponding first and second maintenance openings. The outer aesthetically shaped surrounding shell can for example be molded into two halves which are then assembled together onto, or with, the wheel housing, and thereby surround the wheel housing.

According to another aspect, the dispensing device is provided with an interactive user interface device configured to control operation of the automatic, solid dosage form dispenser. The interactive user interface device can for example be directly integrated into the wheel housing or alternatively and advantageously be positioned on an outer peripheral surface of the wheel housing. Where the wheel housing includes an outer aesthetically shaped surrounding shell, the interactive user interface device can be integrated into, or mounted on, such a surrounding shell, since this can be considered to be an extension of the wheel housing. Accordingly, the interactive user interface device is mounted to the wheel housing in a plane which is substantially tangential to an outer peripheral surface of both the first and second housing walls of the wheel housing. In this context, the expression "in a plane substantially tangential to" is to be understood as meaning that the user interface device is located on a plane that lies at a tangent, or substantially at a tangent, with regard to an outer peripheral surface of the wheel housing. In the case where an aesthetically shaped surrounding shell is also included as part of the wheel housing structure, then the user interface device is correspondingly mounted in a plane that is substantially tangential, or tangential to, the outer peripheral surface of the aesthetically shaped surrounding shell.

According therefore to another aspect, and as will be understood from the above, the solid dosage form dispensing device further comprises a first and a second central axial drive motor. Each central axial drive motor is positioned within a respective wheel housing, along the common axis of rotation and configured to engage with the respective central drive mounting of a corresponding dispensing wheel to drive said wheel in response to a corresponding command received from the interactive user interface device.

The interactive user interface device is configured to control an independent rotation of each of the first and said second rotatable dose dispensing wheels within their respective first and second wheel housings. It is believed such a configuration, in combination with the other features as provided, has not been disclosed or suggested in any of the known devices described in the art.

According to another aspect, the interactive user interface device comprises one or more of a touchscreen, microphone, speaker, camera, and a wireless communications and corresponding functional programs configured for interaction with a user. The interactive user interface can for example, be a smartphone, or tablet, or other similar user interface and input or output device, which is configured for user interaction to operate the device, send appropriate command and control signals to the dispensing device, and report or signal any respective status or operation of the dispensing device to the user. For example, touchscreen interactive user interface devices are known per se, such as tablets or smartphones, or even personal computers and command screens, and are regularly provided for interaction between a user and a correspondingly connected mechanical, electromechanical or electronic device, in order to operate the device or report on the functioning and status of the device. Similarly, voice operated command and control interfaces are also well known per se, as are interfaces that provide voice feedback via synthetic speech, for example. All and any of these can be considered to be useful or suitable for inclusion with regard to the user interface device as envisaged in the present specification.

According to another aspect, the dispenser is provided with an interactive user interface device which is configured to implement one or more biometric identification mechanisms for identification and/or authentication of a user of the dispenser. Such a biometric identification mechanism can, for example, be embodied as a retinal or fingerprint scanner, or alternatively a facial pattern or voice pattern recognition programme, or can combine one or more of the various different biometric identification mechanisms such as those exemplified. The objective behind the provision of such a biometric identification mechanism is to only allow access to the one or more of the various functions of the dispensing device upon successful identification of a user through the use of a biometric parameter. Such functionality can be programmed into the user interface device.

In this way, it is possible to provide multiple user profiles, which are for example only made accessible, and any corresponding functionality associated with those profiles for operation or signalling of the dispensing device, contingent upon successful biometric identification. For example, if the dispensing device has been configured for two people with different treatment regimes, the dispensing device would only be operable for each user on successful identification of each respective user through the use of such a biometric identification mechanism. Similarly, any signalling or reminders of actual or upcoming dosage events can accordingly be programmed to only be triggered on successful identification of a given user's biometric information or associated parameters.

According to another aspect, the dispenser comprises a seating base support. This seating base support is configured to seat the wheel housing such that the housing base plate is positioned in an upright position on a part of the outer peripheral edge of said base plate. The seating base support can be as simple as a horizontal flat base plate, but advantageously is shaped and configured to also define an inner volume between the base plate and a corresponding bottom of the wheel housing. The bottom of the wheel housing in this instance comprises both a part of the outer peripheral edge of the wheel housing base plate and at least a part of the corresponding peripheral walls of the wheel housing.

According to another aspect, the solid dosage form dispenser comprises a solid dosage form filling inlet. The filling inlet is located in an upper region of the wheel housing, when the wheel housing is positioned in the normally upright position for use of the device, for example, when the wheel housing is seated on the seating base support. The dosage form filling inlet extends from an outside surface of a part of both of the circumferentially extending first and second housing walls of the wheel housing to an inside surface of the circumferentially extending first and second housing walls of the wheel housing. The base plate of the wheel housing in such a configuration forms a dividing wall between the first and second circumferentially extending housing walls, thereby forming respective first and second filling inlets, which are located side-by-side, and each one being delimited by the corresponding housing walls.

Advantageously, and according to yet another aspect, the dosage form filling inlet is provided with a selectively rotatable lid. The selectively rotatatable lid is configured to rotate about an axis of rotation which is aligned with a plane of the first and second surfaces of the base plate. In other words, the axis of rotation of the selectively rotatable lid passes through the natural plane of the base plate. The lid can advantageously be configured and shaped to espouse the outer surfaces of the first and second housing walls of the wheel housing. In order to assist in effecting rotation of the lid, for example, using the digits of one hand, including fingers and thumb, or just fingers, the lid can advantageously be provided with one or more appropriately shaped handles, projections or other graspable or pushable members, which effect or apply a rotation to the lid about the axis of rotation. According to a further aspect, the selectively rotatable lid is configured to rotate from a first, closed position, in which access to the first one of the filling inlets is closed, and access to the second one of the filling inlets is open. Similarly, and according to yet another aspect, the selectively rotatable lid is configured to rotate from a first, closed position, in which access to a second one of the filling inlets is closed, and access to the first one of the filling inlets is open. As a counterpart to the preceding aspects, a further aspect is that the selectively rotatable lid is configured to rotate from a first, open position, in which access to a first or a second filling inlet is open, to a second, closed position, in which no access to either the first or second filling inlets is possible. From what precedes, it will be understood that the selectively rotatable lid will generally be in one of three different positions: both filling inlets closed, only first filling inlet open, or only second filling inlet open. As has been indicated above, the user interface device is advantageously configured to only allow operation of the rotatable lid depending on successful biometric identification, for example, or alternatively or additionally, when the dispensing device signals, via the user interface device, that the dispensing wheel is empty and needs refilling with solid dosage forms.

According to another aspect, the dispenser comprises at least one position sensor connected to the interactive user interface device. The at least one position sensor is advantageously configured to indicate to the dispensing device, or user interface device, or both, when the selectively rotatable lid is in an open position or a closed position. This represents an additional safety feature with regard to the dispensing device, and can serve as a reminder to the user that the rotatable lid may need to be closed once again before recommencing dispensing. The position sensor can advantageously also be configured to selectively send a blocking and/or enabling signal controlling rotation of the respective dispensing wheel corresponding to the open filling inlet whilst that inlet remains in the open state. The position sensor can be chosen from any suitable sensor used for detecting or signalling the position of one object with respect to another object, using for example light, sound, electromagnetic radiation, electrical conductivity, temperature, magnetism or electromagnetism and the like, but preferably the sensor is a magnetic sensor making use of the principle of the detection of, or a change in, a magnetic field or magnetic vector to signal a change in position of, for example, the rotatable lid relative to the housing wall of the wheel housing. As an example of a suitable configuration for the present solid dosage form dispenser, one or more magnetic field sensors can be located on or in the wheel housing, and one or more corresponding magnetic field producing elements, such as a permanent or inducible magnet, can be located within the rotatable lid, or vice-versa. Movement of the lid about the axis of rotation will cause a change in the magnetic flux relative to the sensor, and a predetermined minimum value of magnetic flux or magnetic vector picked up at the sensor can be used to determine when the lid is in the open position, and also whether the lid has been rotated to open the first or the second filling inlet, and correspondingly, when the lid has been rotated back to the position in which both filling inlets are closed, for example, due to saturation of the sensor by the magnetic field producing element, or the detection of a maximum threshold value.

In yet a further aspect, the dispenser comprises a solid dosage form dispensing outlet. The outlet is located in a lower region of the wheel housing. The dispensing outlet extends from an inside surface of a part of both of the circumferentially extending first and second housing walls of the wheel housing to an outside surface of the circumferentially extending first and second housing walls of the wheel housing. In such a configuration, the base plate forms a dividing wall between the first and second circumferentially extending housing walls, thereby forming respective first and second dispensing outlets, located side-by-side and delimited respectively by each one of the housing walls.

According to another aspect, the dispenser comprises a first selectively openable and closable shutter, and a second selectively openable and closable shutter. The first and second selectively openable and closable shutters are configured to be, independently of each other, selectively closed or opened, and thereby to prevent, or respectively enable, dispensing of a solid dosage form via gravity from within the respective first or second housing to an outside of the dispenser.

According to one aspect, the selectively openable and closable first and second shutters are sliding doors. The doors are advantageously shaped and configured to conform to an inner or outer surface of the housing walls. It is to be understood that the shutters or doors can thus be moved either along an inner circumferential surface of the housing walls, or an outer circumferential surface of the housing wall, or a combination of inner and outer circumferential surfaces of the housing wall. Preferably, however, and for the sake of simplicity of the dispenser device, the sliding shutters or doors are shaped to conform to, and be moved along, an outside circumferential surface of the housing walls. The first and second shutters or doors are displaced with an appropriate and corresponding displacement mechanism. Whilst many various mechanisms exist for displacing doors or shutters in mechanical devices, the applicants have found that advantageously, and according to another aspect, the selectively and independently openable and closable first and second shutters or doors are connected to a respective first and second linear displacement mechanism. Accordingly, the first and second linear displacement mechanisms are configured to move the first and second shutters or doors, respectively, and independently of each other, along an outer, or an inner, or a combination of outer and inner, surface of a corresponding circumferentially extending housing wall. An example of such a linear displacement mechanism suitable for use in the present dispenser is a motorized rack and pinion mechanism, in which a pinion cog driven by a motor drive shaft, for example a micromotor, is mounted on the outer circumferential surface of the wheel housing and engages with a rack of correspondingly gauged teeth affixed to the door. When the motor is driven, the teeth of the pinion cog engage with the teeth of the rack and, depending on the direction of the drive rotation of the motor, cause the shutter or door to move in one direction or in the opposite direction. The limits of travel of the door are defined by the length of the pinion and the position at which it is affixed along the length of the shutter or door, and are configured to ensure that the shutter or door can be slid from the fully closed position to the fully open position, and vice-versa.

According to another aspect, the sliding shutters or doors are additionally, and advantageously, seated between a corresponding and respective pair of guide members positioned in parallel on the circumferential surface of the wheel housing, and which engage with and guide a circumferential translational movement of the sliding doors via a pair of respectively and correspondingly located parallel grooves provided along a length of the sliding shutters or doors. The interaction of the guide members and grooves additionally has the advantage of preventing or limiting lateral movement of the shutters or doors as the shutters translate along the grooves due to the action of the pinion teeth engaging with the rack teeth when the motor is driven, thereby preventing any misplaced positioning of the shutters relative to the dispensing outlets.

According to yet another aspect, the dispenser comprises a dispensing chute configured to transport a dispensed solid dosage form by gravity from a dispensing outlet of the dispenser to a user or a user recipient. The dispensing chute can be shaped and configured as a spout, for example, having a first end which is connected to the dispensing outlet, and engages therewith such that the first end of the spout is retained against the dispensing outlet. This can be achieved for example by providing elastically deformable lugs which project outwardly from the dispensing chute, and which engage with corresponding openings in the walls of the wheel housing. When the dispensing device is assembled, the elastically deformable lugs of the chute can be constrained to allow the lugs to pass within the openings provided in the wheel housing wall, and then the constraint released to allow the lugs to seat behind and/or engage against an inner surface of the wheel housing walls. The dispensing chute can have a body that is generally arcuate along its length, the arc of the body terminating in a second end from which the dispensed solid dosage forms will drop into a correspondingly freely placed recipient, such as a small beaker, or cup, or even the hand of a user.

According to another aspect, the dispenser comprises at least one wheel position indicator, located in a respective each one of the first and second dispensing wheels. The at least one wheel position indicator is configured to indicate a relative position of each dispensing wheel, for example, as the wheels are rotated to effect solid dosage form delivery by moving the holding compartment from a non dispensing position to a dispensing position in which the solid dosage forms contained therein can be dispensed via the dispensing outlet and dispensing chute. The wheel position indicator can be one of many possible indicators, including indicators such as an electromagnetic radiation source, for example, a light source such as a LED, or an electrical switch, or preferably and advantageously, a magnetic field producing element, for example a permanent or inducible magnet. The position indicator is designed to function either as a standalone indicator, or alternatively and preferably, in conjunction with a sensor.

Accordingly, another aspect of the dispenser is that the dispenser comprises at least one wheel position sensor, located within the base plate. The at least one wheel position sensor is configured to interact with the position indicator. For example, where the indicator is a source of electromagnetic radiation, such as a light source, the sensor would be a light sensor, for example such as a charge coupled device array or equivalent sensor. Preferably however, the sensor is a magnetic sensor, and is configured to detect variations in magnetic field or magnetic flux caused by movement of the magnetic field producing element. In such a configuration, the magnetic field producing element can advantageously be positioned on, or integrated into, the inwardly facing surface of the base plate of the dispensing wheel. As the wheel is rotated, the magnetic field producing element will move either towards, or away from, the magnetic sensor positioned on, or in, the base plate of the wheel housing. The magnetic sensor in the wheel housing base plate is located in a fixed position. Advantageously, each dispensing wheel is provided with a position indicator, and a corresponding position sensor is provided in the base plate of the wheel housing. As a result, the associated changes or variations in magnetic field or magnetic flux caused by rotation of each dispensing wheel are detected by each corresponding sensor and used to determine the position of each dispensing wheel relative to the sensor. This is useful not only during dispensing of the solid dosage forms, to know where the dispensing wheels are in relation to the remaining dosage forms to be dispensed, but also to allow loading of each compartment of the dispensing wheel with the appropriate number or type of solid dosage forms when the corresponding inlet filling port is opened, whereby the compartments of the wheel are presented to the respective inlet filling port by rotation of the wheel so that a given compartment aligns with the respective inlet filling port. As each holding compartment is filled, the wheel is rotated to present the next empty holding compartment until each compartment has been appropriately filled. The positioning sensor and indicator assist in this task by allowing a constant and instantly accurate position of the dispensing wheel to be calculated, and any required correction of the dispensing wheel to be executed. Similarly, if during solid dosage form dispensing, the dispensing wheel is moved too far or too little in any direction, for example due to mechanical tolerances in the motor, drive cog or dispensing wheel, the combination of position indicator and position sensor is used to execute a corrective repositioning of the dispensing wheel.

According to yet another aspect, the dispenser comprises at least one stabilizing roller, extending respectively from the base plate of each wheel housing, the at least one stabilizing roller being positioned to stabilize rotation of a corresponding wheel about the central axis of rotation. The stabilizing roller is an additional measure for assisting in correct positioning of the dispensing wheel, and in particular assists in preventing, or limiting, any lateral movement, or wobble, of the dispensing wheel relative to the central axis, out of the axial alignment in which the dispensing wheel is designed to function. Such undesired lateral movement could cause the wheel to become misaligned relative to its respective inlet filling port and/or dispensing outlet, which potentially could lead to incorrect filling of the holding compartment, and/or jamming of the wheel if any of the solid dosage forms were to fall out of the holding compartment at an incorrect angle.

The invention will now be described in more detail with regard to the associated figures, given for illustrative purposes of suitable examples of the dispensing device as envisaged by the present invention, and in which.

DETAILED DESCRIPTION

Figure 1:
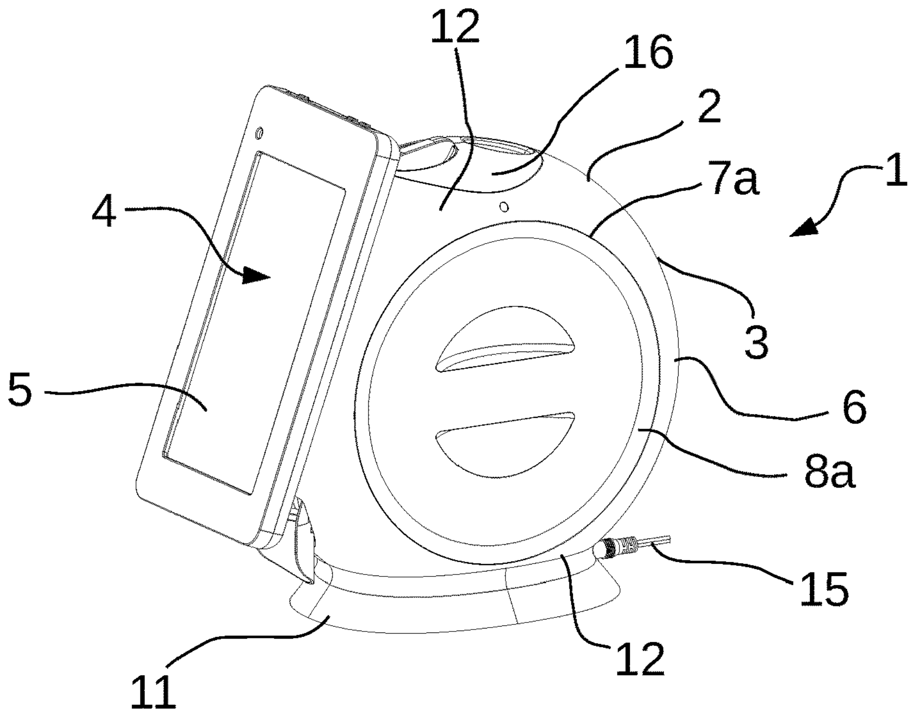
FIG. 1 is a schematic representation of a front perspective view of the right hand side of an automatic, gravity-fed, solid dosage form dispenser according to the invention.
Figure 2:
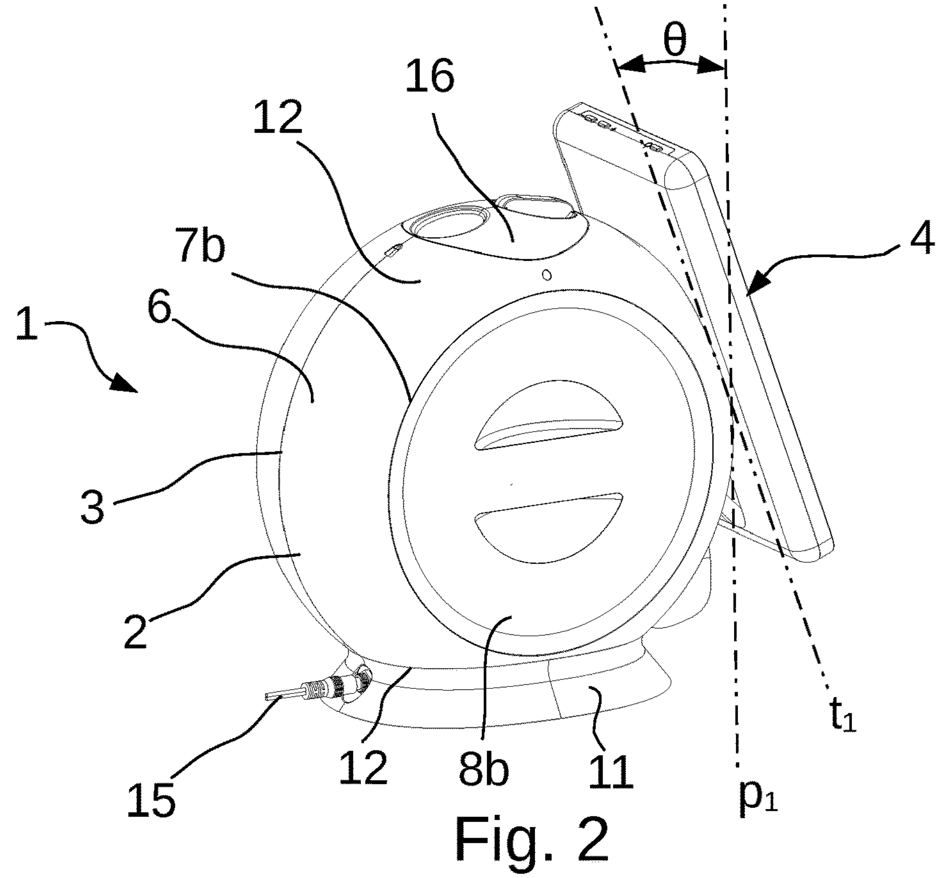
FIG. 2 is a schematic representation of a rear perspective view of the left hand side of the automatic, gravity-fed, solid dosage form dispenser of FIG. 1.

An automatic, gravity-fed, solid dosage form dispenser (1) according to the invention is illustrated in the perspective views of FIGS. 1 and 2, representing front right perspective and left rear perspective views respectively. As can be seen from FIGS. 1 and 2, the dispenser (1) in the present example presents as as a substantially rounded object similar to a circle or disc (2), the disc being located and positioned vertically on its edge (3) and having an interactive user interface device (4) mounted at the front of the dispenser (1) substantially at a tangent, or actually at a tangent ($t_1$, FIG. 2), to a plane (p1, FIG. 2) that is coincident with a vertical plane of the disc (2). The angle θ of inclination of the user interface device (4) relative to the disc (2) is optimized to enable accurate user interaction and relieve muscular fatigue or stress in the event of touch screen interaction via a user's hands, fingers or thumbs or other pointing device, for example, a stylus. The interactive user interface device (4) has a screen (5) for displaying information and is configured to enable interaction with the user, for example, via a touch activated or touch sensitive interface, and/or voice commands. To that end, the interactive user interface device (4) can usefully also comprise one or more of a microphone, speaker, camera, and a wireless communications system, and corresponding functional programs configured for interaction with a user. The user controls and operates a significant proportion of the functionality of the dispenser (1) via the interactive user interface device (4). The interactive user interface device (4) is responsible for receiving commands or instructions from the user and converting those commands or instructions into actionable signals or executable operations to be carried out by the dispenser (1). The interactive user interface device (4) can furthermore comprise one or more biometric identification mechanisms, such as voice or facial recognition, fingerprint or thumbprint recognition, retinal scanning and the like. Such biometric identification mechanisms are known per se in the art and often used to authenticate a user or allow specific access to underlying functionality of a device to which they are connected. The interactive user interface device (4) is also configured to emit sounds or other alerting signals such as visual cues, as appropriate to the situation of use or a given status of the dispenser. The interactive user interface device (4) can also comprise one or more more ports, for example located on a top edge of the interactive user interface, which ports serve, for example, as a means to enable communication of data to and/or from the interactive user interface device, for example for programming the interactive user interface device, or any or all of the functionality of the electronic components comprised in the dispenser.

As can be seen from FIGS. 1 and 2 the dispenser (1) comprises an aesthetically shaped surrounding shell (6), the shell representing an outer body (6) of the dispenser device (1). The surrounding shell, or outer body (6), is provided with a maintenance access opening (7*a*, 7*b*) on either side of the outer body (6). In normal operation the maintenance access openings (7*a*, 7*b*) are closed by respective first and second removable side covers (8*a*, 8*b*). These side covers (8*a*, 8*b*) can be screw threaded into the maintenance access openings (7*a*, 7*b*), for example, or alternatively, snap-fitted using elastically deformable tabs (cf. FIG. 3, references 9*a*, 9*b*, 9*c*, 9*d*) which engage with an inside surface (cf. FIG. 3, reference 10) of the surrounding shell or outer body (6). Removal of the covers (8*a*, 8*b*) occurs in the opposite manner to the way in which they are inserted or snap-fitted into the maintenance access openings (7*a*, 7*b*). FIGS. 1 and 2 also illustrate a support base (11) onto which the disc-shaped outer shell body (6) is mounted and supported. The support base (11) engages with and supports at least a part of the surrounding outer shell body (6) of the dispenser, and extends around at least a part of the circumferential wall (12) of the shell body (6). The support base (11) furthermore defines an inner volume (13) beneath the outer shell body (6) in which a number of components can be located such as a power supply unit (14) for supplying power to the interactive user interface device (4) and various electronic components contained within the dispenser (1) as will be described in more detail hereafter. The power supply unit (14) contained within the support base (11) can be connected to an exterior power supply cable (15) which in turn can be connected to a domestic mains electrical output socket or via a transformer to such a domestic mains electrical output socket (not shown). At the top of the disc shaped dispenser (1) a smaller disc shaped structure can be seen, which represents an inlet port cover (16) which is shaped to correspond substantially in curvature to an upper part of the outer peripheral or circumferential surface wall (12) of the outer shell body (6), the details and functioning of which will be given here below.

Figure 3:
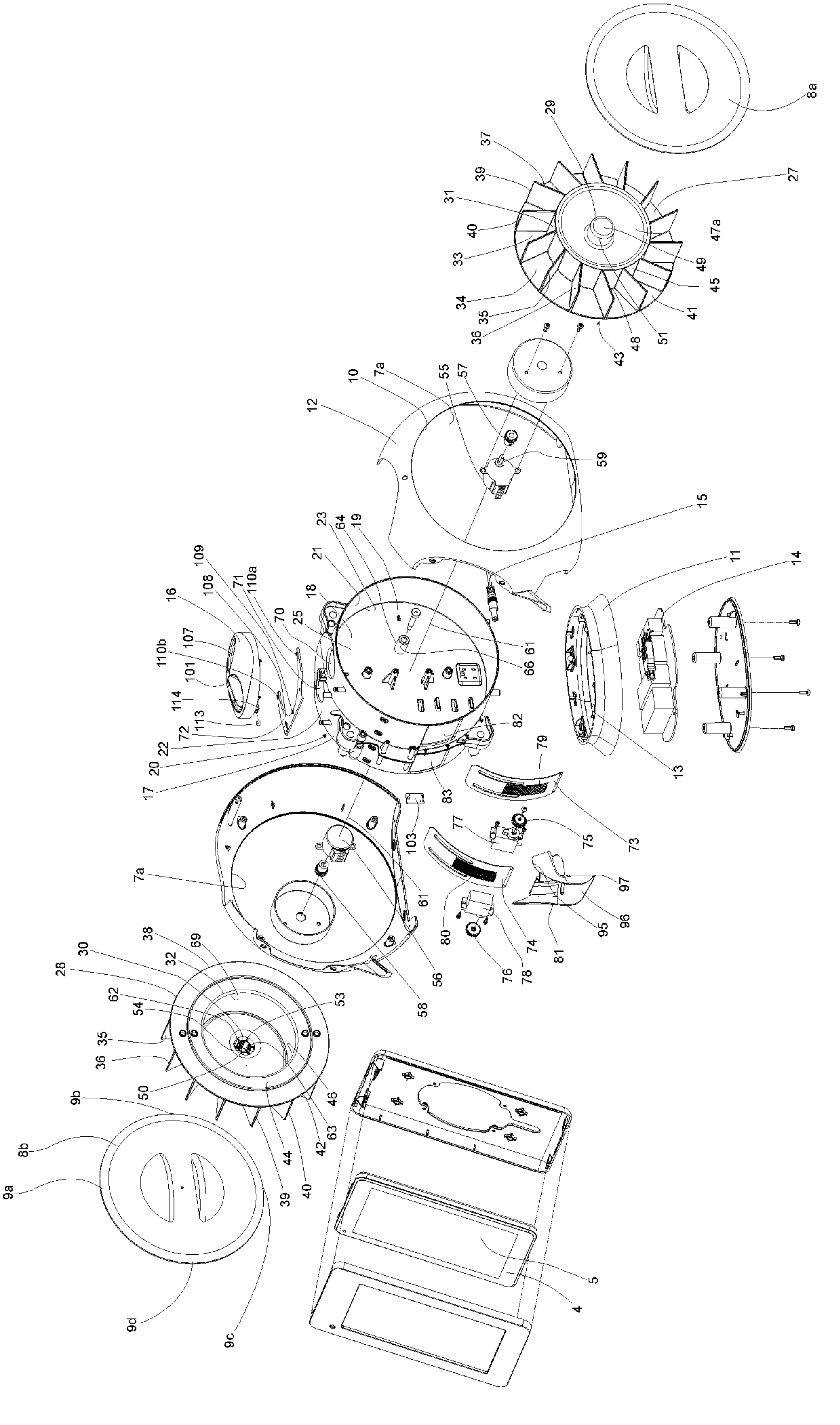
FIG. 3 is a schematic representation of an exploded perspective view of the dispenser according to FIGS. 1 and 2.

FIG. 3 shows an exploded perspective view of an example of the automatic, gravity-fed solid dosage form dispenser (1) according to the invention, and exposes various components of the dispenser (1) separated from each other. As can be seen in FIG. 3, the dispenser (1) comprises a central structure, herein identified as the wheel housing (17). The wheel housing (17) has a base plate (18) with a first side (19), and a second side (20) opposite the first side (19), and a respective first housing wall (21) and a second housing wall (22). As represented in FIG. 3, the first side (19) is located on the right hand side of the dispenser, and the second side (20) is located on the left hand side of the dispenser. To all intents and purposes, the first side (19) and second side (20) of the wheel housing are mirror images of each other. The first housing wall (21) and second housing wall (22) extend respectively outwardly and circumferentially from, and along, an outer peripheral edge (23) of the base plate (18) to form two sub-housings (24*a*, 24*b*), each sub-housing being positioned on a respective side (19, 20) of the base plate (18), and defining a respective first outwardly facing opening (25) and a second outwardly facing opening (26). Each outwardly facing opening (25, 26) receives and houses a respective dispensing wheel (27, 28), More particularly, the internal volumes of each subhousing (24*a*, 24*b*), which are defined by respective inward facing surfaces (29, 30) of the housing walls (21, 22), are the volumes used to receive and house each of the respective rotatable dose dispensing wheels (27, 28).

The first and second rotatable dose dispensing wheels (27, 28) each have a central drive mounting (29, 30), for example, in the shape of a hub (31, 32), and each wheel (27, 28) comprises a plurality of solid dosage form holding compartments (33, 34), or storage chambers. The holding compartments (33, 34) are defined by at least a first and a second opposing walls (35, 36) which extend outwardly respectively from, or proximate to, the central drive mounting (29, 30) of the rotatable wheels (27, 28), towards a respective outer periphery (37, 38) of the rotatable wheel. Each compartment wall (35, 36) has a peripheral edge (39, 40) that faces radially outwardly from the central drive mounting (29, 30). The outer periphery (37, 38) of each wheel (27, 28) is thus a virtually defined, or imaginary, peripheral and circumferential line which is formed by the intersection of the imaginary line with each of the outward facing peripheral edges (39, 40) of the radially extending compartment walls (35, 36).

Each dispensing wheel (27, 28) further comprises a base plate (41, 42), the wheel base plate (41, 42) extending radially outwards from the central drive mounting (29, 30), for example, forming a disc, along a first side face (43, 44) of the wheel. The wheel base plate (41, 42) is preferably in contact with the radially outwardly extending walls (35, 36), or is formed as an integral part of the dispensing wheel structure (27, 28) as a whole.

The central drive mounting (29, 30) is shaped as a hub (31,32) with a peripheral circumferential wall (45, 46) that extends and projects away from a second side face (48*a*, 48*b*), opposite to the first side face (43, 44), of the dispensing wheel base plate (41, 42). The peripheral circumferential wall (45, 46) can be provided with a concave shaped wall (47*a*, 47*b*) which extends from the peripheral circumferential wall (45, 46) towards a central point (49, 50) to close the hub and form a concave outward facing surface. In such a configuration, the compartment walls (35, 36) of the dispensing wheel (27, 28) extend radially outwards from the peripheral circumferential wall (45, 46) of the hub-shaped central drive mounting (29, 30) and along the dispensing wheel base plate (41, 42). The central drive mounting (29, 30) is further provided with a seating nipple (51, 52), which projects outwardly from the concave shaped wall (47*a*, 47*b*) at the centre point (49, 50) thereof. The nipple (51, 52) is configured and shaped on an inside facing surface (53, 54) of the nipple (51, 52) to receive and engage with a drive motor (55, 56), for example, via a drive cog (57, 58) or gear connected to a drive shaft (59, 60) of the drive motor (55, 56).

The internal volumes of each subhousing (24*a*, 24*b*) also serve to seat the respective central drive mountings (29, 30) of each dispensing wheel (27, 28), and the wheel housing (17) base plate (18) is therefore configured to receive, respectively on the first (19) and second (20) opposite sides, the drive motors (55, 56), whereby the respective drive motor shaft (59, 60) and drive cog (57, 58) or gear are positioned along a common central axis (61) which lies orthogonal to the wheel housing base plate (18), in order to enable corresponding drive engagement with the appropriately configured and shaped inside facing surface (53, 54) of the nipple (51, 52) of the central drive mounting (29, 30). The shaped inside facing surface (53, 54) of the nipple (51, 52) is thus advantageously provided with one or more series of teeth (62, 63), which are located on the inside facing surface (53, 54) around the common central axis (61), and which engage with the drive cogs (57, 58) or gear of the drive motors (55, 56) to enable the wheels (27, 28) to be rotated about the central common axis (61) when the drive motors (55, 56) are driven. It should be understood here that each drive motor (55, 56) is independently drivable via the interactive user interface device (4), thereby enabling the dispenser to operate independently for two separate people, for example, in a domestic situation, a couple having different solid dosage medicine regimes.

FIG. 3 also shows the presence of at least one stabilizing roller (64, 65), which extends respectively from the first (19) and second (20) sides of the wheel housing (17) base plate (18). In the device as illustrated there are at least two sets of stabilizing rollers (64, 65), each pair of oppositely located rollers being axially aligned along a common axis which lies parallel to, but spaced apart from, the common central axis (61). The at least one stabilizing roller is positioned to stabilize rotation of a corresponding wheel about the central axis of rotation, and provides a stabilizing engagement surface (66, 67) which engages with an inwardly facing surface (68, 69) of the peripheral circumferential wall (45, 46) of the central drive mountings (29, 30).

FIG. 3 also shows two inlet openings (70, 71) located side by side in a top part of the wheel housing walls (21, 22). The inlet openings (70, 71) define two inlet filling ports to enable top-loading of solid dosage forms into the holding compartments (33, 34) of each wheel (27, 28) in preparation for later dispensing. The inlet openings (70, 71) are closed by the inlet port cover (16) and partially surrounded by a horseshoe-shaped overlay (72), sandwiched between the inlet port cover (16) and the outwardly facing surface of the wheel housing walls (21, 22). The functioning of the inlet port cover (16) and horseshoe-shaped overlay (72) will be described in more detail in regard to FIGS. 12 to 14.

Also visible in FIG. 3 are two slidable shutters (73, 74) which are mounted onto the outward facing surface of the circumferential housing walls (21, 22) of the wheel housing (17), and which are associated with two linear drive mechanisms comprising a rack and pinion linear drive having a pinion cog (75, 76) driven by a motor (77, 78) and corresponding racks of teeth (79, 80) located on an outward facing surface of the slidable shutters (73, 74). A more detailed description of these elements is given with regard to FIGS. 8 and 9.

FIG. 3 furthermore illustrates a dispensing chute (81) which connects to, or is mounted on, the wheel housing (17)

and which is aligned with two dispensing outlet openings (82, 83) provided in the wheel housing walls (21, 22) towards a lower part of the wheel housing (17) and situated at a level below an imaginary horizontal line which runs orthogonal to the common central axis (61). Further detail on the dispensing chute (81) will be provided with regard to the description of FIGS. 8 and 9.

Figure 4:
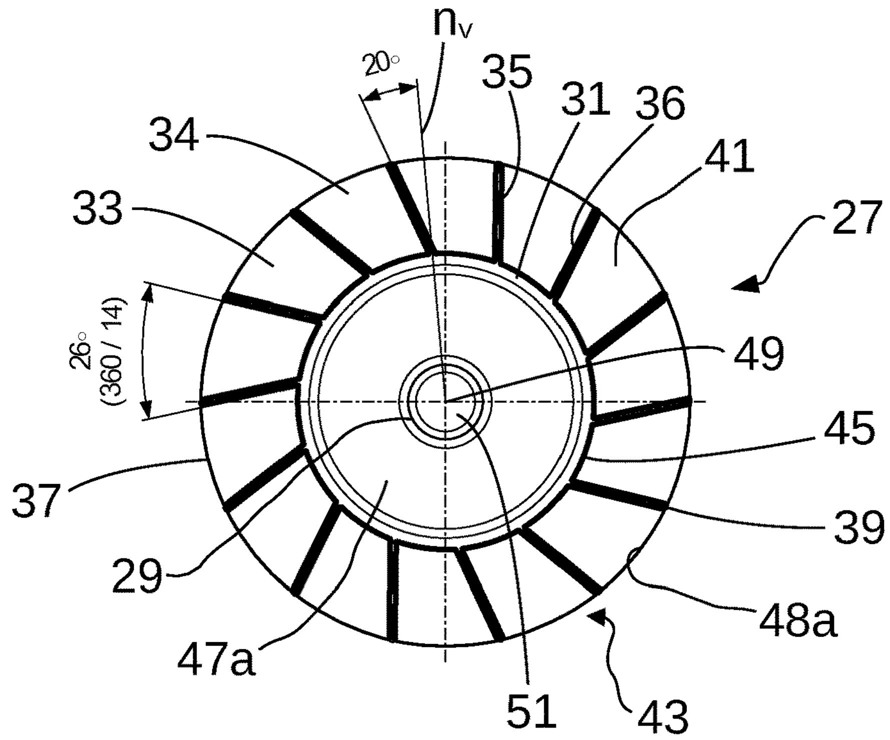
FIG. 4 is a schematic representation of an outer side view of a dispensing wheel of the dispenser according to the invention.

FIGS. 4, 5, 6 and 7 provide further details with regard to the dispensing wheels (27, 28). FIG. 4 is a view of a dispensing wheel as included in the dispenser exemplified here, as seen from an outward facing side of the wheel. In this figure, the wheel (27) resembles a bicycle wheel having a central hub (31, 32) and spokes extending radially from the central hub (31, 32). The hub has a peripheral circumferential wall (45, 46) that extends and projects away from the second side face (48*a*, 48*b*), opposite to the first side face (43, 44), of the dispensing wheel base plate (41, 42). The peripheral circumferential wall (45, 46) is provided with a concave shaped wall (47*a*, 47*b*) which extends from the peripheral circumferential wall (45, 46) towards a central point (49, 50) to close the hub (31, 32) and form a concave outward facing surface. A plurality of solid dosage form holding compartments (33, 34), or storage chambers, in this case 14 such holding compartments representing 14 days worth of prescribed solid dosage form medication, one for each day, are defined by at least a first and a second opposing walls (35, 36) which extend radially outwardly respectively from, or proximate to, the peripheral circumferential wall (45, 46) of the central drive mounting (29, 30), towards a respective outer periphery (37, 38) of the rotatable wheel (27, 28). Each compartment wall (35, 36) has a peripheral edge (39, 40) that faces radially outwardly from the central drive mounting (29, 30). The outer periphery (37, 38) of each wheel (27, 28) is thus a virtually defined, or imaginary, peripheral and circumferential line which is formed by the intersection of the imaginary line with each of the outward facing peripheral edges (39, 40) of the radially extending compartment walls (35, 36). In FIG. 4, the wheel base plate (41, 42) extends outwardly from an inward facing edge of the circumferential walls (45, 46) to the same peripheral extent as the radially extending compartment walls (35, 36), and thus the circumference of the base plate corresponds to the outer periphery (37, 38). It will be noted from FIG. 4, that the radially extending compartment walls (35, 36) do not extend radially straight out from the notional centre of the central drive mounting (29, 30), rather they are inclined one from the next, and in this particular instance, each compartment wall is angled at 20° to a virtual normal ($n_v$) which passes through both the common central axis of the wheel (27, 28) and the point at which the compartment wall begins to extend from the circumferential wall (45, 46). The result of this inclined angle of the compartment walls, one with regard to the next, is that a successive pair of compartment walls defining any given compartment in the wheel has a peripheral angle of opening of 26°. This angle is considered to be an optimal angle to ensure that the solid dosage forms stored in each compartment will fall out naturally under the effect of gravitational pull as the wheel is rotated in a counter-clockwise direction to effect dispensing, and that they do not get stuck at any time in the compartments.

Figure 5:
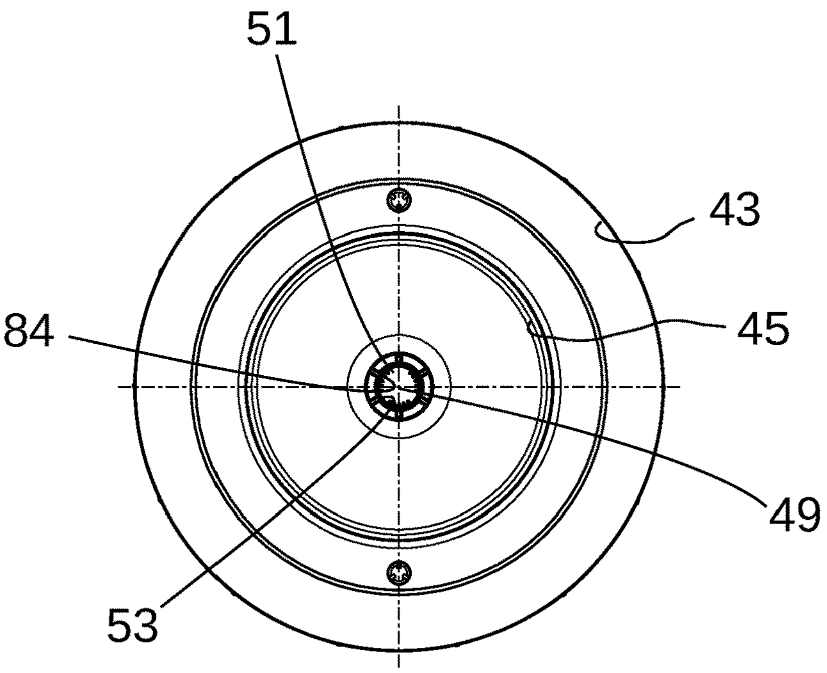
FIG. 5 is a schematic representation of an inner side view of a dispensing wheel of the dispenser according to the invention.

The central drive mounting (29, 30) has a seating nipple (51, 52), which projects outwardly from the concave shaped wall (47*a*, 47*b*) at the centre point (49, 50) thereof. As can be seen in FIG. 5, which represents an inwardly facing side of the dispensing wheel (27, 28), the nipple (51, 52) is configured and shaped on an inward facing surface (53, 54) to receive and engage with a drive motor (55, 56), for example, via a drive cog (57, 58) or gear connected to a drive shaft (59, 60) of the drive motor (55, 56). The inward facing surface (53, 54) of the nipple is provided with a plurality of teeth (84), in the present example, three sets of five teeth, the shape and dimensions of which match those of the teeth of the drive cog (57, 58), and enable the drive cog to mesh with the sets of five teeth of the nipple to drive the wheel in any given direction as determined by the drive direction of the motor (55, 56).

Figure 6:
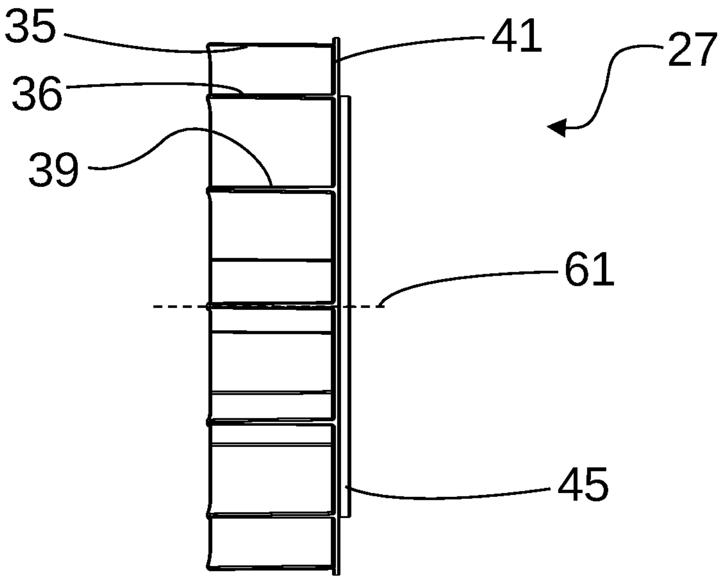
FIG. 6 is a schematic representation of a peripheral edge view of a dispensing wheel of the dispenser according to the invention.

FIG. 6 shows an edge-on view of the dispensing wheel (27, 28), with the common central axis (61) and base plate (41, 42), circumferential walls (45, 46) of the central drive mounting hub (29, 30, 31, 32), and corresponding compartment walls (35, 36) and peripheral edges (39, 40) of these compartment walls.

Figure 7:
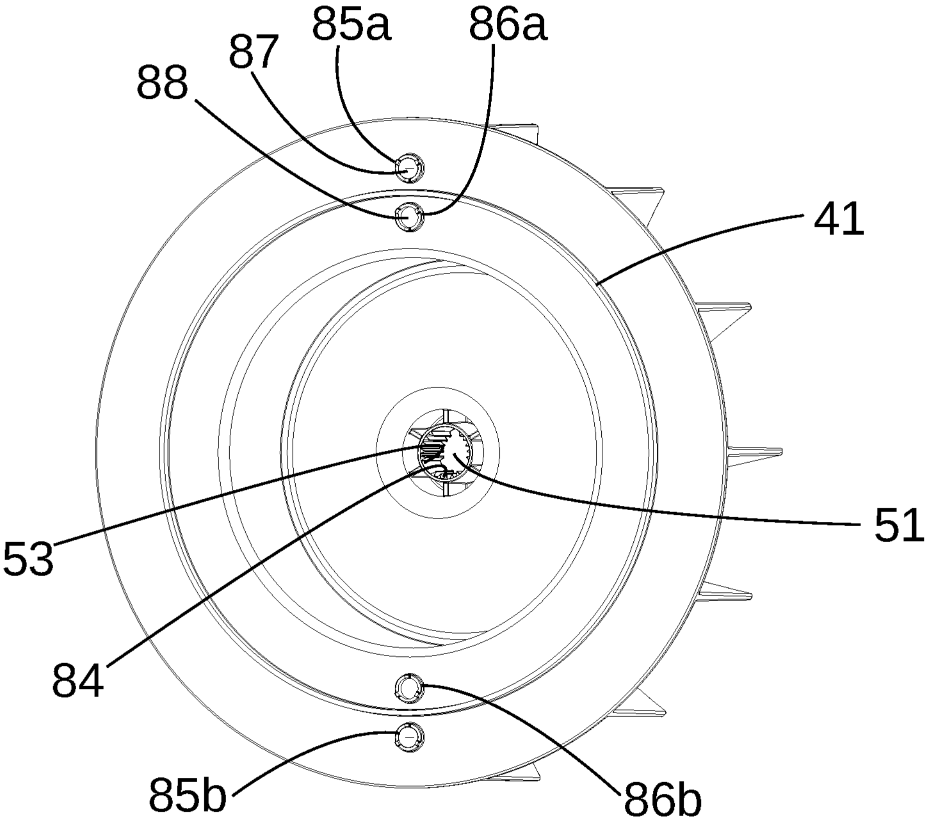
FIG. 7 is a schematic representation of a perspective view of a dispenser wheel similar to that of FIGS. 4 and 5.

FIG. 7 shows a perspective view of one of a dispensing wheel (27, 28), in which the shaped inward facing surface of the nipple can be seen, along with the three sets of five teeth to engage and mesh with the drive cog (57, 58) of the drive motor (55, 56). In addition, the base plate (41) is provided with one or more, and as illustrated here, four, or two pairs, of discrete position indicator housings (85, 86) for receiving a position indicator (87, 88), such as a button-shaped, permanent magnet. As can be seen from FIG. 7, each member of each pair of position indicator housings is situated in diametral opposition to the other member of the same pair. A first pair (85*a*, 85*b*) of position indicator housings is located on a radially peripheral part of the inward facing surface of the wheel plate, whereas the second pair of position indicator housings (86*a*, 86*b*) is located radially inwardly of the first pair. It should be noted that the position indicators (87, 88) are only introduced into, and housed by, one such pair for each wheel (27, 28), i.e. either the radially inner pair, or the radially outer pair, but advantageously neither dispensing wheel will have the same pair occupied by the corresponding position indicators. Such an exclusive arrangement with regard to the occupation of the position indicator housings (85, 86) provides for optimal configuration of the position indicators (87, 88). The position indicators (87, 88) are used to enable the interactive user interface device to calculate the precise position of either dispensing wheel of the dispenser at any given moment, and to command and control a corrective rotational movement of the dispensing wheels (27, 28), should that be required. The position indicators (87, 88) function in combination with corresponding position sensors, which are described in more detail with regard to FIG. 10.

Figure 8:
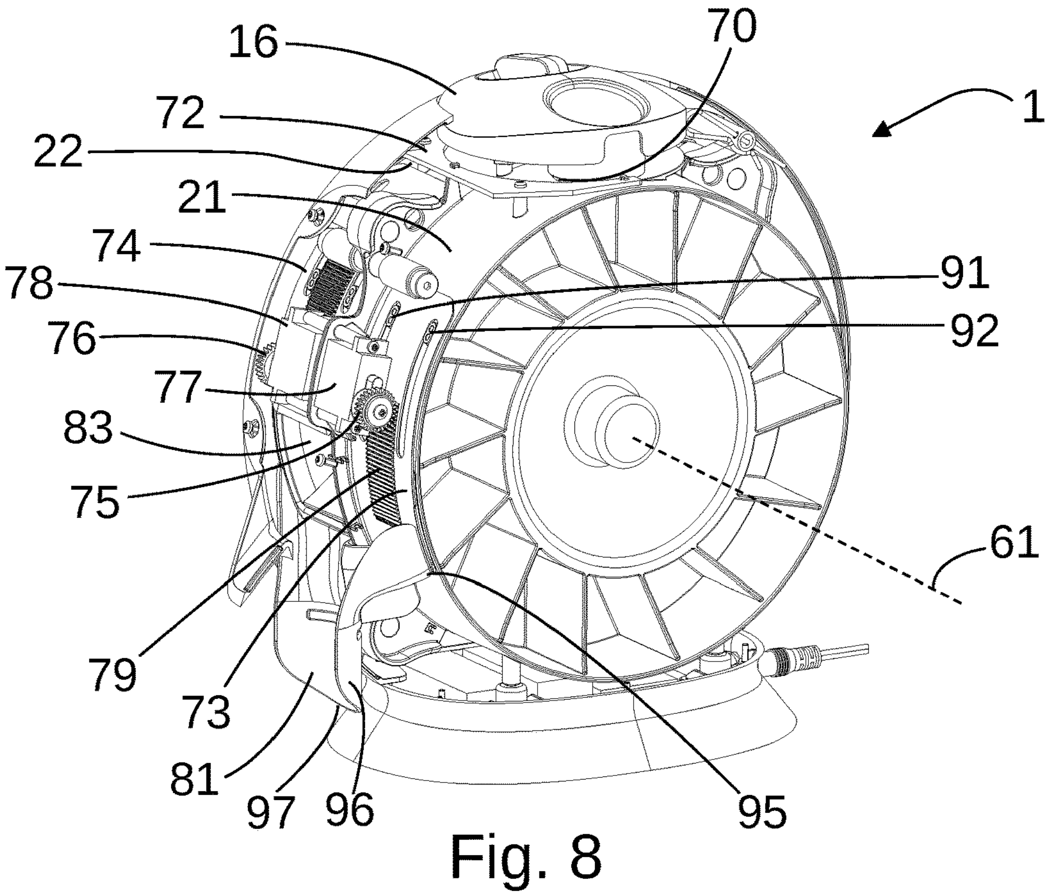
FIG. 8 is a schematic representation of the front perspective view of FIG. 1 with partially removed components to illustrate some details.
Figure 9:
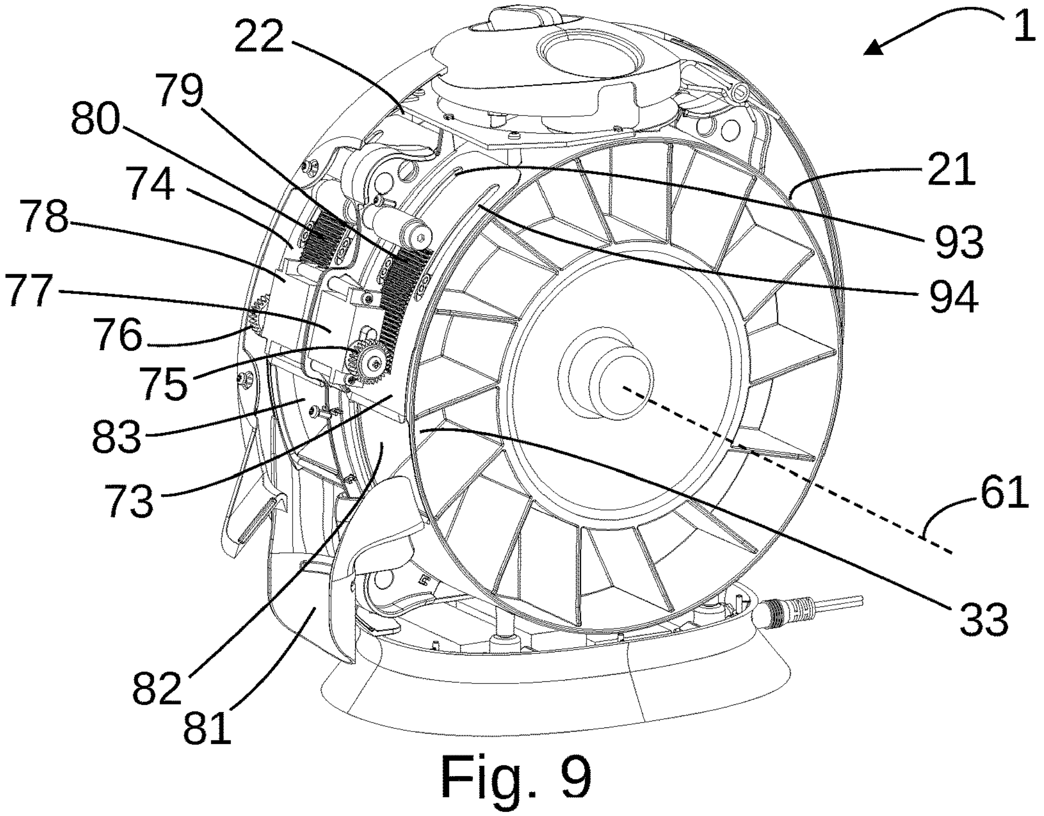
FIG. 9 is a schematic representation of the front perspective view of FIG. 1 with partially removed components to illustrate other details.

FIGS. 8 and 9 are perspective views of the dispenser device (1) in an assembled state apart from a part of the outer body shell which has been removed, along with the interactive user interface device (4) to facilitate understanding. These figures illustrate some of the details of several further aspects of the dispenser (1) that have already been mentioned briefly elsewhere in the present specification, and which will be described in more detail here. At the top of device (1), the inlet port cover (16) can be seen and which partially surrounds the horseshoe-shaped overlay (72), which is mounted on the outwardly facing surface of the wheel housing walls (21, 22). The inlet port cover (16) has been positioned to permit access from the top of the dispensing device to the underlying right-hand side filling inlet opening (70). The functioning of the inlet port cover (16) and horseshoe-shaped overlay (72) will be described in more detail in regard to FIGS. 12 to 14. Additionally, and more particularly, FIGS. 8 and 9 also show two slidable shutters (73, 74) which are shaped and configured to enable closure and opening of the outlet openings (82, 83). The slidable shutters (73, 74) are configured and shaped as relatively thin and long plates, having a width less than the width of a circumferential housing wall, and a length which is optimized for minimal translational displacement and maximum effective coverage with regard to the outlet openings (82, 83). The slidable shutters (73, 74) are mounted onto the outward facing surface of the circumferential housing walls (21, 22) of the wheel housing (17), and are furthermore associated respectively with two linear drive mechanisms. Each linear drive mechanism comprises a rack and pinion linear drive having a pinion cog (75, 76) driven by a motor (77, 78) and corresponding racks of teeth (79, 80) located on an outward facing surface of the slidable shutters (73, 74). The slidable shutters (73, 74) translate along the outer surface of the circumferential housing walls (21, 22) in a first direction to close a respective outlet opening (82, 83), thereby preventing solid dosage forms from falling out of the respective wheel compartment aligned with such an outlet opening (82, 83), and in an opposite direction to open a respective outlet opening (82, 83), thereby allowing the solid dosage forms to fall out of the wheel compartment under the effects of gravitational pull and through the outlet opening (82, 83). The translational movement is effected in one direction or the opposite direction due to the engagement of the pinion cog (75, 76) with a corresponding rack of teeth (79, 80) mounted on or formed integrally with, the slidable shutter, when the pinion cog (75, 76) is driven by the corresponding drive motor (77, 78). To prevent the slidable shutter from being moved laterally, for example due to unequal traction or meshing engagement between the pinion cog (75, 76) and the rack of teeth (79, 80), the slidable shutter (73, 74) engages with a pair of guide members (91, 92), one pair per slidable shutter, which are also located on the outer surface of the circumferential housing walls (21, 22), and situated in parallel and in correspondence to a parallel pair of grooves (93, 94) or tracks provided along the length of the slidable shutter (73, 74). Each guide member (91, 92) of the pair of guide members engages in a corresponding groove (93, 94) of the pair of grooves, and thereby ensures that the slidable shutter (73, 74) does not move laterally outside of the tolerance of the grooves and guide members. In this way, the slidable shutter (73, 74) can translate along its length, and along the outer surface of the circumferential housing walls (21, 22) to effect closure and opening of the outlet openings (82, 83) without risk of jamming, kinking, or otherwise moving out of alignment, thereby ensuring that the slidable shutter (73, 74) either completely covers, or is completely removed from covering, the outlet openings (82, 83). The limits of translational movement of the slidable shutters (73, 74) are defined both by the length of the grooves (93, 94) and the relative position of the guide members (91, 92), and are selected to ensure that the slidable shutters function as intended.

FIGS. 8 and 9 furthermore illustrate the positioning of the dispensing chute (81) with regard to the outlet openings (82, 83). which connects to, or is mounted on, the wheel housing (17) and which is aligned with two dispensing outlet openings (82, 83) provided in the wheel housing walls (21, 22) towards the lower part of the wheel housing (17) and situated at a level below an imaginary horizontal line which runs orthogonal to the common central axis (61). The role of the dispensing chute is to guide the solid dosage form as it falls out of the outlet openings (82, 83) under the effect of gravity, when the slidable shutter (73, 74) has been moved into the open position in which it is no longer covering the outlet opening (82, 83). The dispensing chute (81) is formed like a spout and has a curved or arcuate profile which extends from a first end (95), where it is mounted on to the wheel housing circumferential walls (21, 22), to a delivery lip (96) located at a free, second end (97) of the spout shaped dispensing chute (81).

The main differences between FIGS. 8 and 9 are as follows. FIG. 8 shows a left-hand side sliding shutter (74) in the open position, such that communication between the left-hand side outlet opening (83) and the dispensing chute (81) has been established. In this position, shutter (74) has been moved up and around the circumference of the housing wall (22) by the drive motor (78) and pinion cog (76) engagement with the teeth (80). In this open position therefore, solid dosage forms that were previously held within the holding compartment (34) of the left-hand side dispensing wheel (28, not visible) are now free to fall out through the left-hand side outlet opening (83) under the effect of gravitational pull and into the spout shaped dispensing chute (81), from which they can fall or be guided by the curved profile of the spout shaped dispensing chute (81). Also visible in FIG. 8 is the positioning of the right-hand side shutter (73), which is set in the closed position, completely covering the right-hand side outlet opening (82). Furthermore, the limit of permitted translational movement of the slidable shutter (73) is defined by the pair (91, 92) of parallel located guide members and their interaction with the pair of parallel located corresponding grooves (93, 94). FIG. 9 on the other hand, shows an identical positioning of the left hand sliding shutter (74) in the open position, but also illustrates the open position setting of the right hand sliding shutter (73), thereby allowing any solid dosage forms held within the holding compartment (33) to fall out by gravity through the right-hand side outlet opening (82) and into the dispensing chute (81). Here again, the limit of translational movement of the shutter (73) is defined by the interaction between the pair of guide members (91, 92) and the corresponding grooves (93, 94) of the sliding shutter (73).

Figure 10:
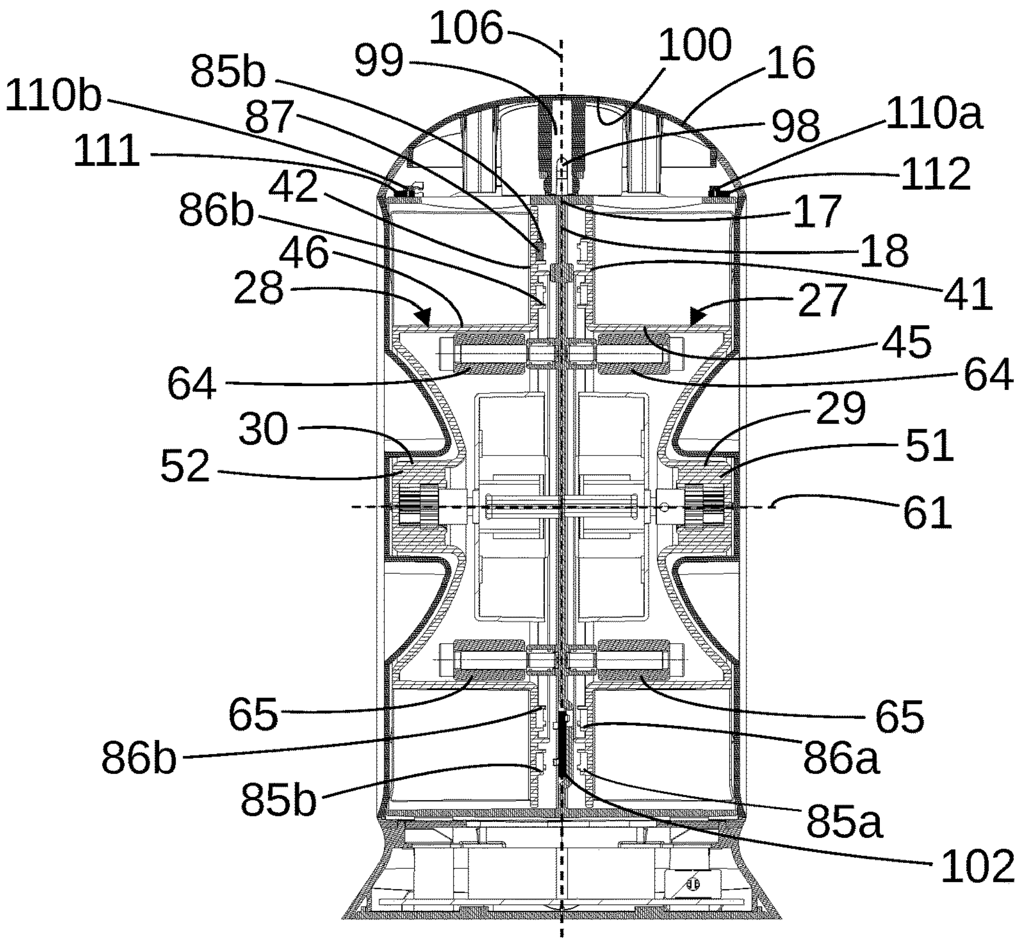
FIG. 10 is a schematic representation of a cross section view of the dispenser according to FIG. 1.

FIG. 10 illustrates a cross-section of the dispenser according to one exemplified embodiment of the invention, with the view looking towards a rear of the dispenser. This view shows the inlet port cover (16) located on top of the dispenser, and having an outward facing surface, which espouses the shape and curvature of the outer shell body (6). The inlet port cover is connected to a peripheral edge of the wheel housing base plate (18) via a projecting spigot (98) extending from the peripheral edge of the wheel housing base plate to form an axis of rotation for the inlet port cover (16). The inlet port cover (16) engages with the spigot (98) via an inwardly oriented bore (99) which extends from an inward facing surface (100) of the cover (16) and which is shaped and configured to elastically deform and engage with the spigot (98) to retain the cover (16) on the spigot (98) whilst allowing rotation of the cover (16) about the spigot (98), for example through manual interaction of a user with the inlet port cover (16). The inlet port cover (16) is provided with an appropriate grip or manipulation member (101), for example, shaped as a projecting button or handle, which extends away from an outer surface of the inlet port cover (16). FIG. 10 also illustrates the relative positions and mounting of wheel housing (17), wheel housing base plate (18), dispensing wheels (27, 28), central drive mounting (29, 30), nipple (51,52) and corresponding common central axis (61) with the respective drive motors (55, 56). Two sets of stabilizing rollers (64, 65) can also be seen situated either side of the common central axis (61), respectively above and below the common central axis (61), the rollers engaging respective inward facing surfaces of the hub of the central drive mounting (29, 30) of each dispensing wheel (27, 28). The dispensing wheel base plate (41, 42) can additionally be seen extending from an inside edge of the circumferential walls (45, 46) forming the central drive mounting (29, 30). On an inside, or inward, facing surface of the wheel base plate (41, 42), the position indicator housings (85, 86) can be seen, wherein the radially outermost top left-hand side position indicator housing (85*a*) on the left-hand side wheel base plate (42) has been fitted with a position indicator (87, 88) such as a button shaped permanent dipole magnet. A similar such magnetic position indicator (87, 88) would usually be similarly located in a corresponding radially innermost position indicator housing (86*a* or 86*b*), e.g. on the right-hand side of the wheel base plate at 86*a*. Furthermore, FIG. 10 illustrates a position sensor system (102), situated towards the bottom, or lower region of, and within, the wheel housing base plate (18).

Figure 11:
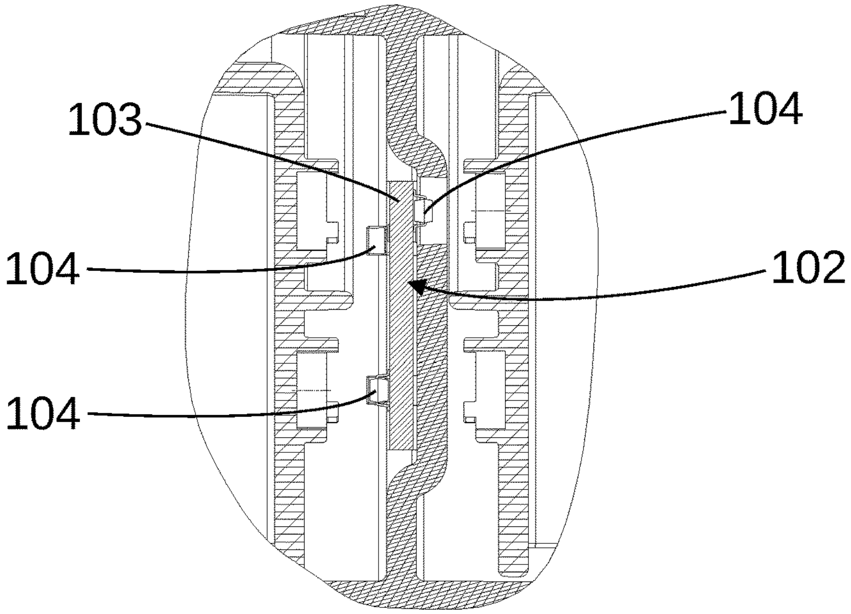
FIG. 11 is a schematic representation of a closer detail of part of the dispenser illustrated in FIG. 10.

FIG. 11 shows an enlarged, partially torn away, detail of the position sensor system (102) of FIG. 10. The position sensor system comprises a printed circuit board (103) and one or more position sensors (104, 105) electrically connected to the printed circuit board (103). The position sensors (104, 105) are advantageously magnetic position sensors, which function on the principle of detecting variations in magnetic field or magnetic flux in relation to a magnetic field producing member such as the permanent dipole button magnet position indicators (87, 88) described above. It will be understood that the wheel position sensors (104, 105) are located in a fixed position relative to the position indicators (87, 88) which are moved or rotated around the common central axis (61) by the drive motors when the dispensing wheels (27, 28) are driven by the drive motors (55, 56). Movement of the magnetic position indicators (87, 88) about the axis of rotation (61) causes the level of magnetic field or magnetic flux that is detected at the magnetic position sensors to vary as the wheels are rotated. The position sensors (104, 105) are connected to, and communicate with, the interactive user interface device (4) to enable a precise positioning of the wheels to be determined at any moment. Such positioning surveillance allows, should that be required, for a corrective driving instruction, or independently actuated operation, of the corresponding respective drive motor (55, 56) to be executed to correct the position of the dispensing wheels (27, 28). This can be necessary, for example, when filling the dispenser holding compartments of each wheel (27, 28) in order to align the compartment walls (35, 36) correctly with the respective inlet openings (70, 71), and similarly, when dispensing the solid dosage forms, to perfectly align the compartment walls (35, 36) of the dispensing wheels (27, 28) with the corresponding respective outlet openings (82, 83) before the sliding shutters (73, 74) are opened to permit gravitational falling out of the solid dosage forms from the respective wheel compartments.

Figure 12A:
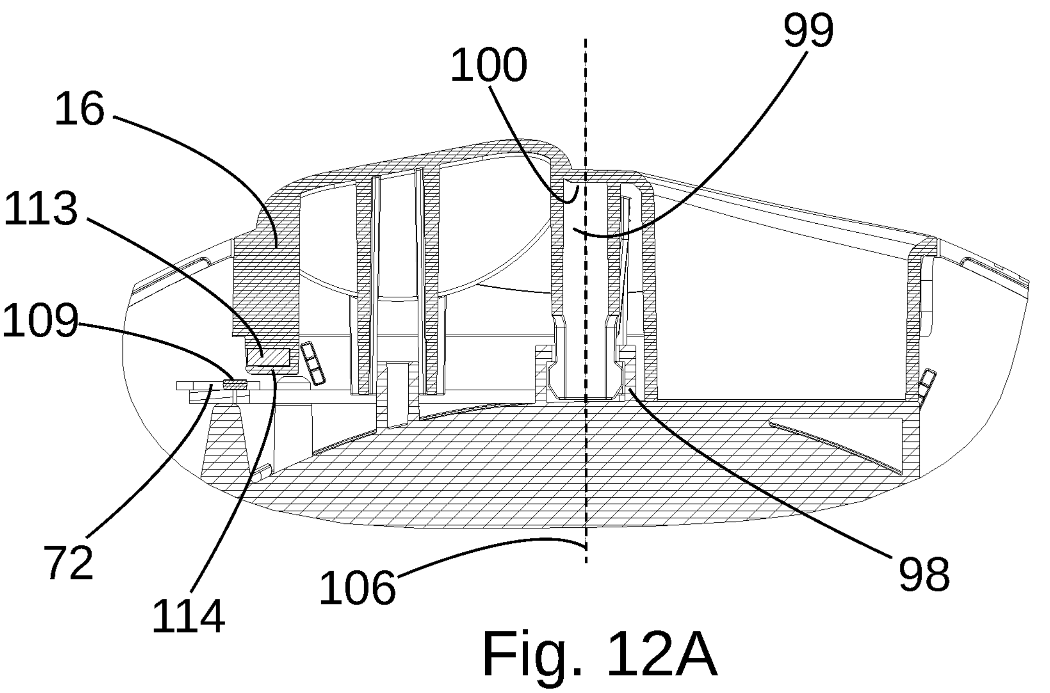
FIG. 12A is a schematic representation of a cross section view of a detail of the dispenser in a first position.
Figure 12B:
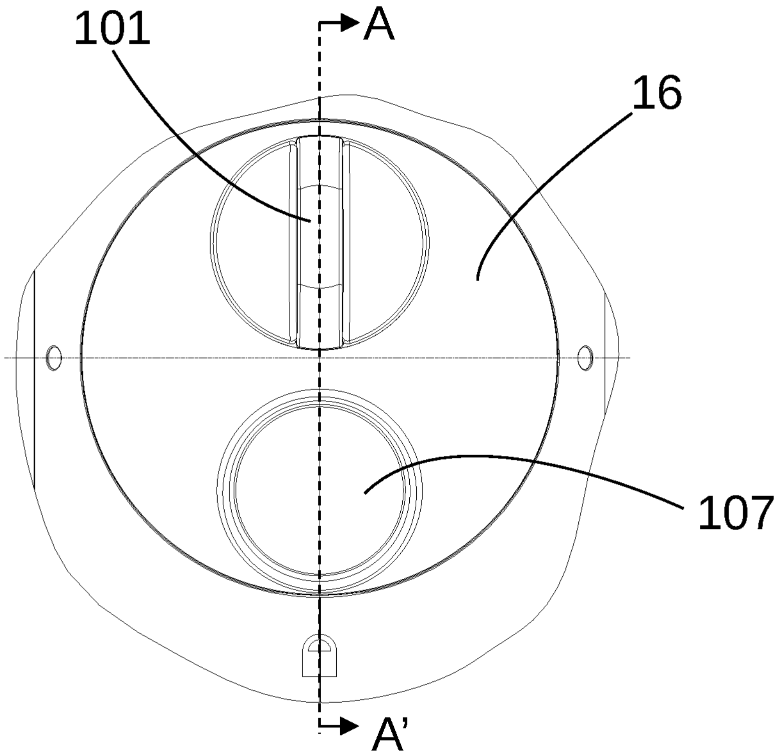
FIG. 12B is a schematic representation of a top view of the detail of FIG. 12A in the first position.

FIGS. 12A to 14B are a series of views that illustrate the functioning of the inlet port cover (16), which is designed to allow the dispensing device to be filled, or refilled, with solid dosage forms to be dispensed. FIGS. 12A and 12B are, respectively, a cross sectional view of a first position of the inlet port cover (16) looking in the direction A-A', and a top view of the same cover (16), particularly illustrating a closed position of the cover (16) with regard to the inlet openings (70, 71). The inlet port cover (16) engages with a mounting spigot (98) via an inwardly oriented bore (99) which extends from an inward facing surface (100) of the cover (16) and which is shaped and configured to elastically deform and engage with the spigot (98) to retain the cover (16) on the spigot (98) whilst allowing rotation of the cover (16) about the spigot (98), for example through manual interaction of a user with the inlet port cover (16). The inlet port cover (16) is provided with an appropriate grip or manipulation member (101), for example, shaped as a projecting button or handle, which extends away from an outer surface of the inlet port cover (16). In order to set the cover (16) to any of the available positions, the manipulation member (101) is operated via the hands, digits, thumbs or a combination thereof of a user of the device, to cause the cover (16) to rotate about a vertical axis of rotation (106) which is coincidental to the vertically oriented plane of the wheel housing base plate (18). The inlet port cover (16) additionally comprises an opening (107) which extends through the cover (16), and which is located opposite to the manipulation member (101). As the handle (101) is moved about the vertical axis of rotation (106), the opening (107) is also moved to the same extent. In this way, the opening (107) provided in the inlet port cover (16) can be moved into a number of positions enabling access to either none of the inlet filling openings, the first inlet filling opening (70), or the second inlet filling opening (71), in a mutually exclusive manner. In the first position, the filling system is essentially, and to all intents and purposes, closed to any filling of the wheel compartments (33, 34) by solid dosage forms. This closed position is therefore illustrated in FIGS. 12A and 12B.

Figure 13A:
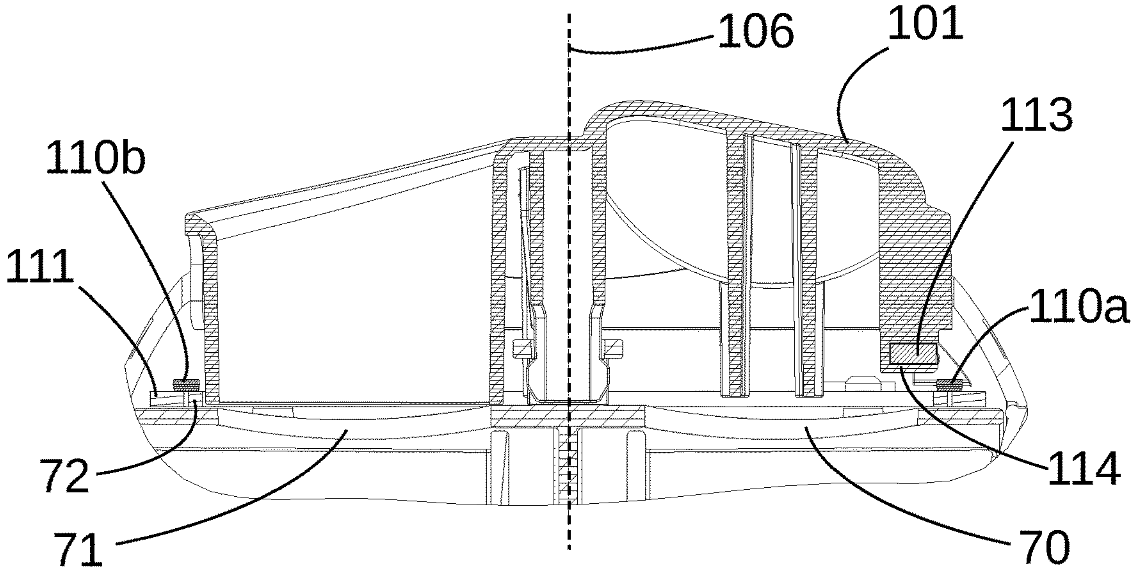
FIG. 13A is a schematic representation of a cross section view of a detail of the dispenser in a second position.
Figure 13B:
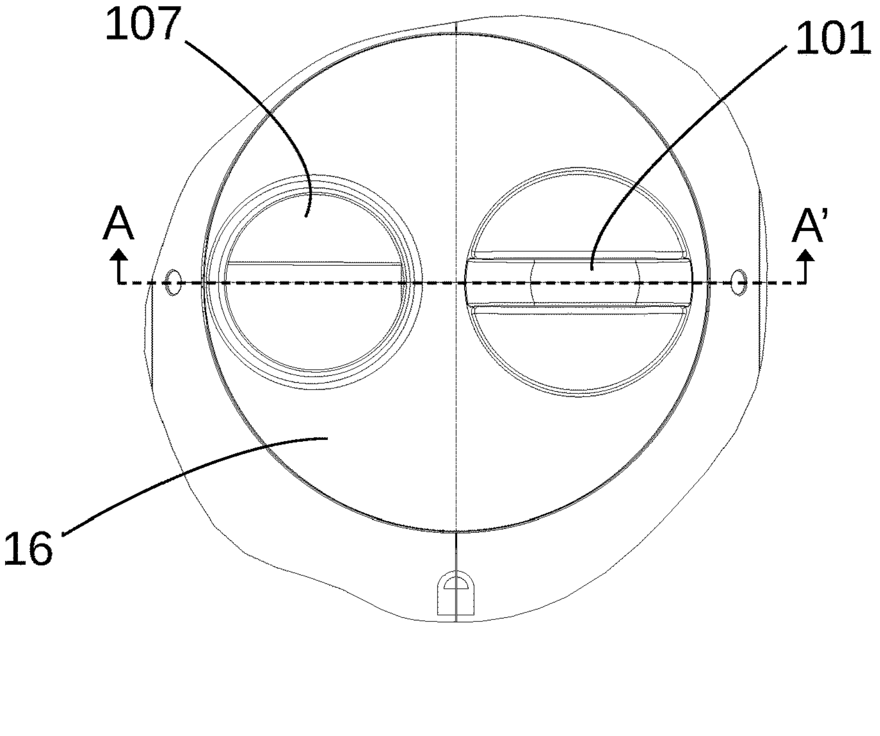
FIG. 13B is a schematic representation of a top view of the detail of FIG. 13A in the second position.

FIGS. 13A and 13B are, respectively, a cross sectional view of a second position of the inlet port cover (16), and a top view of the same cover (16), particularly illustrating the second position of the cover (16) with regard to the inlet openings (70, 71). In the second position as exemplified in FIGS. 13A and 13B, the left-hand side inlet opening (71) is accessible for filling of the wheel compartments with solid dosage forms.

Figure 14A:
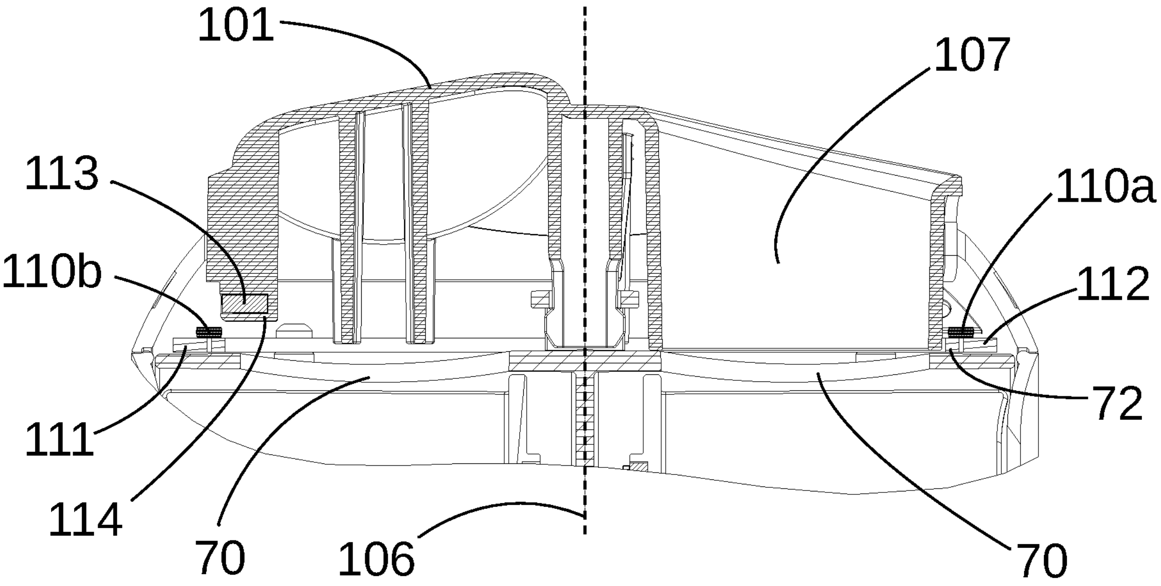
FIG. 14A is a schematic representation of a cross section view of a detail of the dispenser in a third position.
Figure 14B:
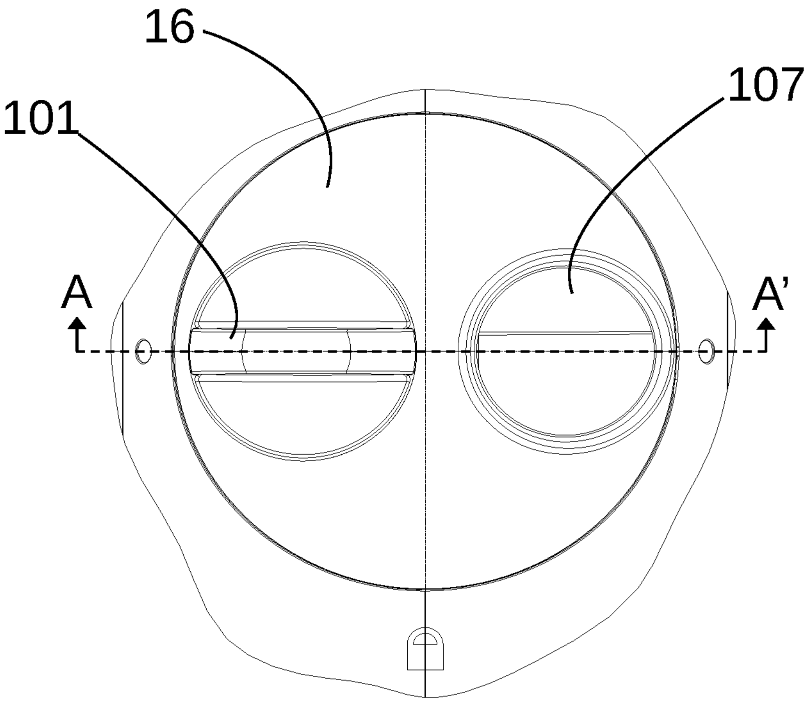
FIG. 14B is a schematic representation of a top view of the detail of FIG. 14A in the third position.

FIGS. 14A and 14B are, respectively, a cross sectional view of a third position of the inlet port cover (16), and a top view of the same cover (16), particularly illustrating the third position of the cover (16) with regard to the inlet openings (70, 71). In the third position as exemplified in FIGS. 14A and 14B, the right-hand side inlet opening (70) is accessible for filling of the wheel compartments with solid dosage forms.

The horseshoe-shaped overlay (72) that is positioned between the cover (16) and the underlying inlet openings (70, 71), comprises a printed circuit board (108) having at least one position sensor (109) and preferably two, or even preferably three, position sensors (109, 110*a*, 110*b*), such as a magnetic position sensor, connected to, or integrated with, the circuit board (108), and preferably situated at a respective end (111, 112), and midway position, of the horseshoe-shaped interlay (72). The circuit board (108) is connected electrically, or otherwise communicates with, the interactive user interface device (4). The position sensors (109, 110*a*, 110*b*) function with a position indicator (113), such as, for example, a permanent dipole button magnet, which is located, seated or otherwise housed within the inlet port cover (16), preferably in a peripheral housing (114) provided within the cover (16). In a similar manner to the way in which the dispensing wheel (27, 28) position is detected, the position sensors detect and reads variations or changes in magnetic field or magnetic vector, as the inlet port cover is moved between the corresponding position sensors (109, 110*a*, 110*b*). These readings are used to determine the position in which the cover is currently located with regard to the inlet openings (70, 71). For example, in FIGS. 12A and 12B, the magnet (113) is located above position sensor (109) at a midway position along the length of the horseshoe (72). In FIGS. 13A and 13B, the magnet is located, after rotation about the axis (106), in position at a first end (111) of the horseshoe (72). In FIGS. 14A and 14B, the magnet, after rotation about the axis (106) in an opposite direction to that of FIGS. 13A and 13B, is located at the second end (112) of the horseshoe (72).

There now follows a brief description of the functioning of the dispenser related to the filling of the dispenser with solid dosage forms. The inlet cover (16) is rotated about the vertical axis of rotation (106) in order to move the cover from the first, closed position, to either the second, open position, or the third, open position, in which the opening (107) in the cover (16) is moved into a superposed relationship above either the right-hand side inlet opening (70), or the left-hand side inlet opening (71), thereby allow access respectively and mutually exclusively, to one or the other of the inlet openings (70, 71). A patient and user of the dispenser, or a healthcare professional, is identified and/or authenticated with the dispenser via a biometric identification mechanism, such as a fingerprint, facial recognition, or voice recognition. Identification and/or authentication is effected in a manner known per se in the art via the interactive user interface device (4). Once successful identification has been achieved, the interactive user interface device (4) unlocks the corresponding drive motor (55, 56) for each of the dispensing wheels (27, 28). The user then proceeds to fill a first compartment made accessible via the inlet opening with solid dosage forms corresponding to the desired dosage regimen of that person or intended recipient of the dosage forms. The required solid dosage forms fall by gravity into the available compartment. Once that available compartment has been filled, the interactive user interface device commands the drive motor to move the dispensing wheel in an anti-clockwise direction to cause the next adjacent compartment to be positioned below the inlet opening. The precise positioning of each compartment is automatically adjusted via the functional interoperation of wheel housing position sensors and the position indicators located on the dispensing wheel. Each compartment is filled with the required quantity of solid dosage form until all of the compartments of that dispenser wheel have been filled. The user then rotates the cover (16) into the other open position to allow access to the other dispensing wheel via the correspondingly accessible inlet opening. The procedure for filling each compartment of the second wheel is repeated until all of the compartments are appropriately filled. The dispenser is now ready to dispense the solid dosage forms. The inlet cover is moved once more back to the closed position, in which none of the inlet ports are accessible.

Dispensing of the solid dosage forms occurs at programmed intervals, in accordance with a preprogrammed dispensing regime transmitted to the interactive user interface device, the dispensing regime only making the solid dosage forms of any given compartment at the appropriate time or interval. Additionally, the release of the dosage forms from the compartments can be conditional on successful identification and/or authentication of the user or intended patient of the dispenser. The interactive user interface device can alert a user to the time at which a given set of solid dosage forms are to be taken, for example, via a voice alert, or other form of audible or visual notification, displayed or emitted by the interactive user interface device. Each time that a compartment is set to deliver the solid dosage forms held therewithin, the dispenser automatically rotates the corresponding dispensing wheel to the correct alignment with the outlet openings, and causes the corresponding respective slidable shutter to be moved into the open position so that the solid dosage forms contained within the compartment will fall out by gravity into the hand of the recipient, or into a correspondingly and appropriately located container, such as a beaker, positioned below the spout of the dispensing chute.

The invention claimed is:

1. An automatic, gravity-fed, solid dosage form dispenser, comprising:

a first rotatable dose dispensing wheel and a second rotatable dose dispensing wheel, the first and second rotatable dose dispensing wheels each having a central drive mounting and each comprising a plurality of solid dosage form holding compartments defined by at least a first and a second opposing walls extending outwardly respectively from, or proximate, the central drive mounting of the first rotatable wheel and the second rotatable wheel, towards a respective outer periphery of the first rotatable wheel and the second rotatable wheel;

a wheel housing having a base plate with a first side and a second side opposite the first side, and a respective first housing wall and a second housing wall, the first and second housing walls extending respectively outwardly and circumferentially from, and along, an outer peripheral edge of the base plate to form two sub-housings, each sub-housing positioned on a respective side of the base plate, and defining a respective first outwardly facing opening and a second outwardly facing opening to receive said first rotatable dose dispensing wheel and said second rotatable dose dispensing wheel therein respectively, wherein the first rotatable dose dispensing wheel is received by the first outwardly facing opening, and the second rotatable dose dispensing wheel is received by the second outwardly facing opening; and an interactive user interface device configured to control operation of the automatic, solid dosage form dispenser;

wherein the first and said second rotatable dose dispensing wheels are configured to be rotatable independently of one another via their respective central drive mountings;

wherein the respective first and second rotatable dose dispensing wheels and central drive mountings are positioned along a common axis of rotation which is perpendicular to the base plate of the wheel housing;

wherein the interactive user interface device is mounted to the wheel housing in a plane which is substantially tangential to an outer peripheral surface of both the first and second housing walls of the wheel housing; and an independent rotation of each of the first and said second rotatable dose dispensing wheels within their respective first and second wheel housings is controlled via the interactive user interface device, for dispensing purposes.

2. Automatic, gravity-fed, solid dosage form dispenser according to claim 1, comprising a seating base support configured to seat said wheel housing with the housing base plate positioned upright on a part of the outer peripheral edge of said base plate.

3. Automatic, gravity-fed, solid dosage form dispenser according to claim 1, comprising a solid dosage form filling inlet, located in an upper region of the wheel housing, the dosage form filling inlet extending from an outside surface of a part of both of the circumferentially extending first and second housing walls of the wheel housing to an inside surface of the circumferentially extending first and second housing walls of the wheel housing, the base plate forming a dividing wall between the first and second circumferentially extending housing walls, thereby forming respectively a first filling inlet and a second filling inlet, one for each of said housing walls.

4. Automatic, gravity-fed, solid dosage form dispenser according to claim 3, wherein the dosage form filling inlet is provided with a selectively rotatable lid, configured to rotate about an axis of rotation aligned with a plane of the first and second sides of the base plate.

5. Automatic, gravity-fed, solid dosage form dispenser according to claim 4, wherein the selectively rotatable lid is configured to rotate from a first, closed position, in which access to the first filling inlet is closed, and access to the second filling inlet is open.

6. Automatic, gravity-fed, solid dosage form dispenser according to claim 4, wherein the selectively rotatable lid is configured to rotate from a first, closed position, in which access to the second filling inlet is closed, and access to the first filling inlet is open.

7. Automatic, gravity-fed, solid dosage form dispenser according to claim 4, wherein the selectively rotatable lid is configured to rotate from a first, open position, in which access to the first filling inlet or the second filling inlet is open, to a second, closed position, in which no access to either the first filling inlet or the second filling inlet is possible.

8. Automatic, gravity-fed, solid dosage form dispenser according to claim 4, comprising at least one position sensor connected to the interactive user interface device and configured to indicate when the selectively rotatable lid is in an open position or a closed position.

9. Automatic, gravity-fed, solid dosage form dispenser according to claim 1, comprising a solid dosage form dispensing outlet, located in a lower region of the wheel housing, the dispensing outlet extending from an inside surface of a part of both of the circumferentially extending first and second housing walls of the wheel housing to an outside surface of the circumferentially extending first and second housing walls of the wheel housing, the base plate forming a dividing wall between the first and second circumferentially extending housing walls, thereby forming respective first and second dispensing outlets, one for each of said housing walls.

10. Automatic, gravity-fed, solid dosage form dispenser according to claim 1, comprising a first selectively openable and closable shutter and a second selectively openable and closable shutter, wherein said first and second selectively openable and closable shutters are configured to be, independently of each other, selectively closed or opened, to prevent, or respectively enable, dispensing of a solid dosage form via gravity from within the respective first or second housing to an outside of the dispenser.

11. Automatic, gravity-fed, solid dosage form dispenser according to claim 10, wherein the first and the second selectively openable and closable shutters are sliding doors, shaped to conform to an inner or outer surface, or a combination of inner and outer surface, of the housing walls.

12. Automatic, gravity-fed, solid dosage form dispenser according to claim 10, wherein the first and the second selectively openable and closable shutters are connected to a respective first and second linear displacement mechanism.

13. Automatic, gravity-fed, solid dosage form dispenser according to claim 1, wherein the first and second linear displacement mechanisms are configured to move the first and second shutters respectively, and independently of each other, along an outer, or an inner, or a combination of outer and inner, surface of a corresponding circumferentially extending housing wall.

14. Automatic, gravity-fed, solid dosage form dispenser according to claim 10, wherein the wheel housing wall comprises at least one pair of guide members for each of the first and the second selectively openable and closable shutters positioned on the circumferential surface of the wheel housing, and which engage with and guide a circumferential translational movement of the first and the second selectively openable and closable shutters via at least one corresponding pair of grooves provided along a length of each of the first and the second selectively openable and closable shutters.

15. Automatic, gravity-fed, solid dosage form dispenser according to claim 1, comprising a dispensing chute configured to transport a dispensed solid dosage form by gravity from a dispensing outlet of the dispenser to a user or a user recipient.

16. An automatic, gravity-fed, solid dosage form dispenser according to claim 1, comprising at least one wheel position indicator, located in a respective each one of the first and second dispensing wheels.

17. An automatic, gravity-fed, solid dosage form dispenser according to claim 1, comprising at least one wheel position sensor, located within the base plate.

18. An automatic, gravity-fed, solid dosage form dispenser according to claim 1, comprising a first and a second central axial drive motor, each central axial drive motor positioned within a respective wheel housing, along the common axis of rotation and configured to engage with the respective central drive mounting of a corresponding dispensing wheel to drive said wheel in response to a corresponding command received from the interactive user interface device.

19. An automatic, gravity-fed, solid dosage form dispenser according to claim 1, comprising at least one stabilizing roller, extending respectively from the base plate of each wheel housing, the at least one stabilizing roller being positioned to stabilize rotation of a corresponding wheel about the central axis of rotation.

20. An automatic, gravity-fed, solid dosage form dispenser according to claim 1, wherein the interactive user interface device comprises one or more of a touchscreen, microphone, speaker, camera, and a wireless communications and corresponding functional programs configured for interaction with a user.

21. An automatic, gravity-fed, solid dosage form dispenser according claim 1, wherein the interactive user interface device is configured to implement one or more biometric identification mechanisms for identification and/or authentication of a user of the dispenser.

* * * * *